(12) United States Patent
Takeda et al.

(10) Patent No.: US 10,014,987 B2
(45) Date of Patent: *Jul. 3, 2018

(54) WIRELESS COMMUNICATION TERMINAL, BASE STATION DEVICE, RESOURCE ALLOCATION METHOD

(71) Applicant: Sun Patent Trust, New York, NY (US)

(72) Inventors: Kazuki Takeda, Kanagawa (JP);
Hidetoshi Suzuki, Kanagawa (JP);
Ayako Horiuchi, Kanagawa (JP);
Akihiko Nishio, Osaka (JP)

(73) Assignee: Sun Patent Trust, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/401,817

(22) Filed: Jan. 9, 2017

(65) Prior Publication Data

US 2017/0117990 A1    Apr. 27, 2017

Related U.S. Application Data

(63) Continuation of application No. 14/342,283, filed as application No. PCT/JP2013/003906 on Jun. 21, 2013, now Pat. No. 9,591,519.

(30) Foreign Application Priority Data

Aug. 2, 2012    (JP) ................. 2012-172224

(51) Int. Cl.
*H04L 12/26*    (2006.01)
*H04L 1/18*    (2006.01)
(Continued)

(52) U.S. Cl.
CPC .......... *H04L 1/1861* (2013.01); *H04L 1/1864* (2013.01); *H04W 72/042* (2013.01);
(Continued)

(58) Field of Classification Search
None
See application file for complete search history.

(56) References Cited

U.S. PATENT DOCUMENTS 9,591,519 B2 *    3/2017    Takeda ................ H04W 28/044
2011/0194516 A1    8/2011    Aiba et al.
(Continued)

FOREIGN PATENT DOCUMENTS

| EP | 2 383 928 A2 | 11/2011 |
| JP | 2013-042265 A | 2/2013 |
| WO | 2012/050389 A1 | 4/2012 |

OTHER PUBLICATIONS

3GPP TS 36.211 V10.4.0, "3rd Generation Partnership Project; Technical Specification Group Radio Access Network; Evolved Universal Terrestrial Radio Access (E-UTRA); Physical Channels and Modulation (Release 10)," Dec. 2011, 101 pages.
(Continued)

*Primary Examiner* — Mohammad Anwar
*Assistant Examiner* — Angel Brockman
(74) *Attorney, Agent, or Firm* — Seed IP Law Group LLP

(57) ABSTRACT

A radio communication terminal that increases the ACK/NACK resource utilization efficiency while preventing ACK/NACK collision, and that causes no unnecessary reduction of the PUSCH band in a system that transmits E-PDCCH control information. The radio communication terminal adopts a configuration including a receiving section that receives a control signal including an ACK/NACK index via an enhanced physical downlink control channel (E-PDCCH) transmitted using one configuration from among one or a plurality of configuration candidates, a control section that selects a resource to be used for an ACK/NACK signal of downlink data from among specified resources specified beforehand based on E-PDCCH configuration information used for transmission or reception of the
(Continued)

E-PDCCH and the ACK/NACK index, and a transmitting section that transmits the ACK/NACK signal using the selected specified resource.

22 Claims, 29 Drawing Sheets

(51) Int. Cl.
*H04W 72/04* (2009.01)
*H04W 84/04* (2009.01)

(52) U.S. Cl.
CPC .......... *H04L 1/1812* (2013.01); *H04W 72/04* (2013.01); *H04W 84/042* (2013.01)

(56) References Cited

U.S. PATENT DOCUMENTS

| | | |
|---|---|---|
| 2012/0320848 A1 | 12/2012 | Chen et al. |
| 2013/0034064 A1 | 2/2013 | Nam et al. |
| 2013/0114530 A1 | 5/2013 | Chen et al. |
| 2013/0195065 A1 | 8/2013 | Park |
| 2014/0003375 A1 | 1/2014 | Nam et al. |
| 2014/0307643 A1 | 10/2014 | Fröberg Olsson et al. |
| 2014/0355531 A1 | 12/2014 | Han et al. |
| 2015/0016311 A1 | 1/2015 | Han et al. |

OTHER PUBLICATIONS

3GPP TS 36.212 V10.4.0, "3rd Generation Partnership Project; Technical Specification Group Radio Access Network; Evolved Universal Terrestrial Radio Access (E-UTRA); Multiplexing and channel coding (Release 10)," Dec. 2011, 79 pages.
3GPP TS 36.213 V10.4.0, "3rd Generation Partnership Project; Technical Specification Group Radio Access Network; Evolved Universal Terrestrial Radio Access (E-UTRA); Physical layer procedures (Release 10)," Dec. 2011, 125 pages.
Extended European Search Report, dated Feb. 23, 2016, for corresponding EP Application No. 13825710.0-1851 / 2882250, 10 pages.
International Search Report, dated Aug. 27, 2013, for corresponding International application No. PCT/JP2013/003906, 2 pages. (W/ English Translation).
Nokia Siemens Networks, Nokia, "HARQ-ACK resource allocation for data scheduled via ePDCCH," R1-121290, Agenda Item: 7.6.4, 3GPP TSG-RAN WG1 Meeting #68bis, Jeju, Korea, Mar. 26-30, 2012, 2 pages.
Sharp, "PUCCH resource managment for CoMP Scenarios," R1-121352, Agenda Item: 7.5.6.3, 3GPP TSG RAN WG1 Meeting #68bis, Jeju, Korea, Mar. 26-30, 2012, 15 pages.
English Translation of Taiwanese Search Report, dated Oct. 24, 2017, for the related Taiwanese Patent Application No. 102123524, 2 pages.
LG Electronics, "Multiplexing PDSCH and E-PDCCH within a PRB pair," R1-120449, 3GPP TSG RAN WG1 Meeting #68, Agenda item: 7.6.2, Dresden, Germany, Feb. 6-10, 2012, 2 pages.
NEC Group, "Physical resources block (PRB) configurations for ePDCCH transmission," R1-122596, Agenda item: 7.6.5, Prague, Czech Republic, May 21-25, 2012, 2 pages.

* cited by examiner

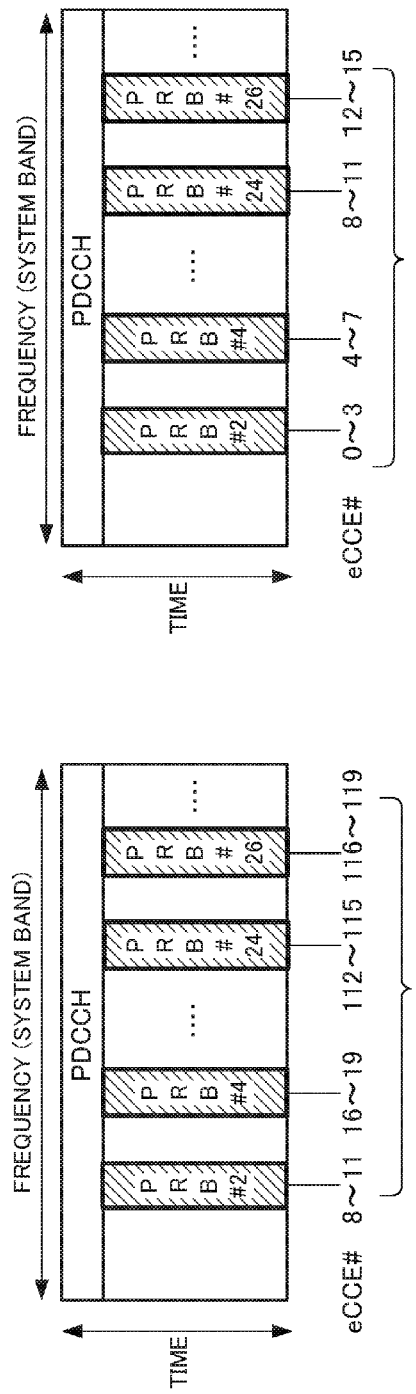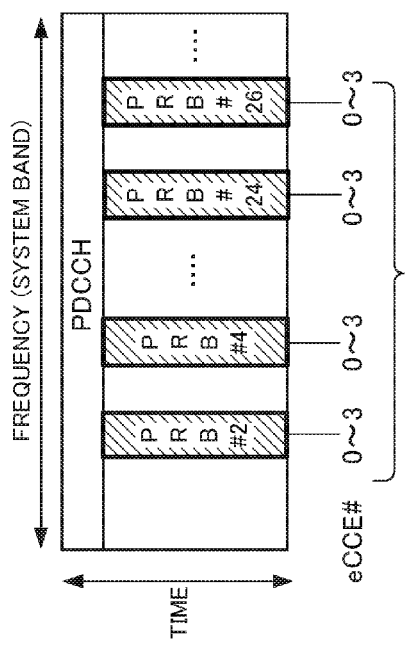
FIG. 4A
FIG. 4B
FIG. 4C

| VALUE OF ARI | A/N resource set |
|---|---|
| 00 | A |
| 01 | B |
| 10 | C |
| 11 | D |

FIG. 7

| VALUE OF ARI | E-PDCCH Configuration ||| 
| | Configuration A<br>A/N resource set A | Configuration B<br>A/N resource set B | Configuration C<br>A/N resource set C |
| --- | --- | --- | --- |
| 00 | A | W | O |
| 01 | B | X | P |
| 10 | C | Y | Q |
| 11 | D | Z | R |

| VALUE OF ARI | E-PDCCH Configuration | | |
|---|---|---|---|
| | Configuration A<br>A/N resource set A | Configuration B<br>A/N resource set B | Configuration C<br>A/N resource set C |
| 00 | A | W | O |
| 01 | B | X | P |
| 10 | C | | |
| 11 | D | | |

FIG. 13B

| VALUE OF ARI | E-PDCCH Configuration | | |
|---|---|---|---|
| | Configuration A<br>A/N resource set A | Configuration B<br>A/N resource set B | Configuration C<br>A/N resource set C |
| 00 | A | W | O |
| 01 | B | X | P |
| 10 | | Y | Q |
| 11 | | Z | R |

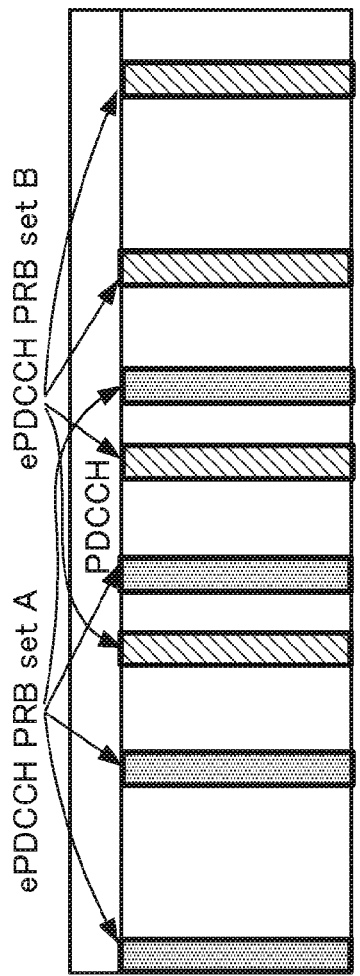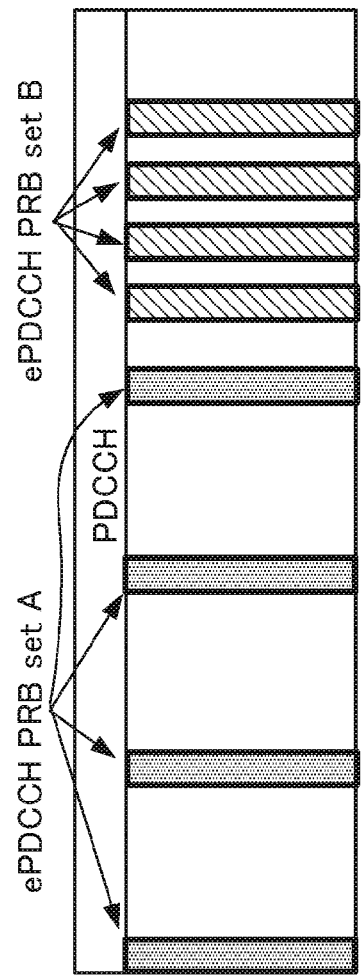
FIG. 15A
FIG. 15B

| VALUE OF ARI | PRB set A<br>A/N resource set A | PRB set B<br>A/N resource set B |
|---|---|---|
| 00 | A | W |
| 01 | B | X |
| 10 | C | Y |
| 11 | D | Z |

FIG. 16

| VALUE OF ARI | Common search space | UE-specific search space |
|---|---|---|
| | A/N resource set A | A/N resource set B |
| 00 | A | W |
| 01 | B | X |
| 10 | C | Y |
| 11 | D | Z |

FIG. 20

| VALUE OF ARI | Distributed mode | Localized mode |
| --- | --- | --- |
| | A/N resource set A | A/N resource set B |
| 00 | A | W |
| 01 | B | X |
| 10 | C | Y |
| 11 | D | Z |

FIG. 23

| VALUE OF ARI | E-PDCCH Configuration | |
|---|---|---|
| | Configuration A | Configuration B |
| | A/N resource set A | A/N resource set B |
| 00 | A, VCID-0 | W, VCID-1 |
| 01 | B, VCID-0 | X, VCID-1 |
| 10 | C, VCID-0 | Y, VCID-1 |
| 11 | D, VCID-0 | Z, VCID-1 |

FIG. 30

WIRELESS COMMUNICATION TERMINAL, BASE STATION DEVICE, RESOURCE ALLOCATION METHOD

BACKGROUND

Technical Field

The present invention relates to a radio communication terminal, a base station apparatus, and a resource allocation method.

Description of the Related Art

The 3GPP (3rd Generation Partnership Project Radio Access Network) has established LTE (Long Term Evolution) Rel. 8 (Release 8) and the enhanced version of LTE, which is LTE Rel. 10 (LTE-Advanced). In these standards, a base station, and a radio communication terminal (also called "UE (User Equipment)" and referred to below as a terminal) transmit control information for transmitting and receiving data using a downlink PDCCH (physical downlink control channel) (refer to Non-Patent Literatures 1 to 3). FIG. 1 shows the subframe configuration of the downlink. In the subframes, the PDCCH that transmits a control signal and the PDSCH (physical downlink shared channel) that transmits a data signal are time-division multiplexed. A terminal first decodes the control information transmitted to the terminal through the PDCCH and obtains information regarding a frequency allocation required for data reception on the downlink, and adaptive control, for example. The terminal then decodes data for the terminal that is included in the PDSCH, based on the control information. If control information that permits data transmission on the uplink is included in the PDCCH, the terminal transmits data on the PUSCH (physical uplink shared channel) of the uplink, based on the control information.

In order to transmit and receive data on the downlink, an HARQ (hybrid automatic request) combining error correction decoding and an automatic retransmission request has been introduced. After performing error correction decoding, the terminal judges whether or not the data is correctly decoded, based on a CRC (cyclic redundancy checksum) appended to the data. If the data is correctly decoded, the terminal feeds back an ACK to the base station. If, however, the data is not correctly decoded, the terminal feeds back a NACK to the base station, prompting retransmission of the data in which an error is detected. The feedback of ACK/NACK (acknowledge response; hereinafter referred to as "A/N") is transmitted on the uplink. If data is not assigned to the PUSCH at the time of A/N transmission, A/N is transmitted on the PUCCH (physical uplink control channel). If, however, data is assigned to the PUSCH at the time of A/N transmission, A/N is transmitted on either the PUCCH or the PUSCH. When this is done, the base station instructs the terminal beforehand as to whether transmission is to be done on the PUCCH or the PUSCH. FIG. 2 shows the uplink subframe configuration that includes the PUSCH and the PUCCH.

If A/N is transmitted on the PUCCH, there are situations to be handled differently. For example, if the A/N transmission overlaps with the feedback of CSI (channel state information) periodically transmitted on the uplink, the PUCCH formats 2a/2b are used. On the downlink, if carrier aggregation, in which transmission is performed using a plurality of carriers that are bundled together, is set to ON, and also the number of carriers is at least three, the PUCCH format 3 is used. However, regardless of whether carrier aggregation is OFF or ON, if the number of carriers is two or fewer and there is no control information other than A/N and other than an uplink scheduling request, even if the number of carriers does not exceed two, the PUCCH formats 1a/1b are used. In considering that downlink data is transmitted more frequently than uplink data, and also considering that the period of CSI feedback is not more frequent than the period of downlink data assignment, A/N is most often transmitted by the PUCCH formats 1a/1b. The following description will focus on the PUCCH formats 1a/1b.

FIG. 3 shows the slot configuration of the PUCCH formats 1a/1b. The A/N signals transmitted by a plurality of terminals are distributed by the Walsh sequence having a length-4 sequence and a DFT (discrete Fourier transform) sequence having a length-3 sequence and are code multiplexed and received at the base station. In FIG. 3, ($W_0$, $W_1$, $W_2$, $W_3$) and ($F_0$, $F_1$, $F_2$) represent, respectively, the above-noted Walsh sequence and DFT sequence. At the terminal, a signal representing either ACK or NACK first undergoes primary spreading to frequency components corresponding to one SC-FDMA symbols by a ZAC (zero auto-correlation) sequence (with a subcarrier having a length-12 sequence) in the frequency domain. That is, a ZAC sequence having a sequence length of 12 is multiplied by an A/N signal component represented by a complex number. Then, the A/N signal after primary spreading and the ZAC sequence as a reference signal undergo secondary spreading by a Walsh sequence ($W_0$ to $W_3$ of a length-4 sequence, also called a Walsh code sequence) and a DFT sequence ($F_0$ to $F_2$ of a length-3 sequence). That is, each component of a signal having a length-12 sequence (an A/N signal after primary spreading or a ZAC sequence (reference signal sequence)) is multiplied by each component of an orthogonal sequence (for example, a Walsh sequence or a DFT sequence). Additionally, the signal after secondary spreading is transformed by an IFFT (inverse fast Fourier transform) to a length-12 sequence (subcarrier) signal in the time domain. Then, a CP (cyclic prefix) is added to each signal after the IFFT, thereby forming a one-slot signal made up of seven SC-FDMA symbols.

A/N signals from different terminals are spread using ZAC sequences corresponding to different cyclic shift indexes or orthogonal code sequences corresponding to different orthogonal cover indexes (OC indexes). The orthogonal code sequence is a set of a Walsh sequence and a DFT sequence. The orthogonal code sequence is also called a block-wise spreading code sequence. Therefore, by using the conventional despreading and correlation processing, the base station can demultiplex the plurality of A/N signals that have been code multiplexed and cyclic shift multiplexed. Because there is a limit to the number of A/N signals that can be code multiplexed and cyclic shift multiplexed per frequency resource block (RB), if the number of terminals becomes large, frequency multiplexing is performed using different RBs. In the following, the code-RB resource in which A/N is transmitted will be called the A/N resource. The A/N resource number is determined by the number of the RB in which A/N is transmitted and the code number and cyclic shift value in the RB. Because multiplexing by cyclic shifting of the ZAC sequence can be treated as a type of code multiplexing, there will be cases in which orthogonal code and cyclic shift will be collectively called code in the following description.

In LTE, in order to reduce interference from other cells on the PUCCH, the ZAC sequence to be used is determined based on the cell ID. Because the mutual correlation between different ZAC sequences is small, by using different ZAC sequences between different cells, the interference can be reduced. Also, in the same manner, sequence hopping and cyclic shift hopping based on the cell ID has been introduced. With these hoppings, shifting is done cyclically in units of SC-FDMA symbols, using a cyclic shift hopping pattern determined based on the cell ID, while mutual correlation on the cyclic shift axis and orthogonal code axis are maintained. Doing this enables randomization of combinations of A/N signals that are strongly interfered by other cells, while the mutual orthogonal relationship between A/N signals are maintained within a cell, and also enables removal of continuous strong interference to only some of the terminals from other cells.

In the description to follow, the description will be of the case in which a ZAC sequence is used for primary spreading, and a block-wise spreading code sequence is used for secondary spreading. However, for the primary spreading, rather than using a ZAC sequence, sequences that are mutually separable by mutually different cyclic shift values may be used. For example, a GCL (general chirp-like) sequence, a CAZAC (constant amplitude zero auto correlation) sequence, a ZC (Zadoff-Chu) sequence, a PN sequence such as an M sequence or an orthogonal Gold code sequence, or a computer-generated random sequence having sharp autocorrelation characteristics may be used for the primary spreading. As long as the sequence can be treated as being mutually orthogonal or substantially mutually orthogonal, any sequence can be used as a block-wise spreading code sequence for the secondary spreading. For example, a Walsh sequence or a Fourier sequence or the like can be used as a block-wise spreading code sequence for the secondary spreading.

In LTE, as a method of allocating different A/N resources to different terminals, allocation is used that is based on control information mapping results of the PDCCH. That is, using the fact that PDCCH control information is not mapped onto the same resources between a plurality of terminals, a one-to-one correspondence is established between the PDCCH resources and the PUCCH formats 1a/1b A/N resources (hereinafter described simply as A/N resources). This will be described in detail below.

The PDCCH is made up of one or more L1/L2 CCHs (L1/L2 control channels). Each L1/L2 CCH is made up of one or more CCEs (control channel elements). That is, a CCE is the basic unit of mapping control information onto a PDCCH. Also, when one L1/L2 CCH is made up of a plurality (2, 4, or 8) of CCEs, a plurality of continuous CCEs with a CCE having an even-numbered index as the origin is allocated to that L1/L2 CCH. The base station, in accordance with the number of CCEs necessary for notification of control information to the subject terminal to which resources are to be allocated, allocates an L1/L2 CCH to the terminal to which the resources are to be allocated. The base station then maps the control information onto the physical resources corresponding to the CCE of that L1/L2 CCH. In this case, there is a one-to-one correspondence between each CCE and A/N resource. Therefore, a terminal that has received an L1/L2 CCH identifies the A/N resources corresponding to the CCEs making up that L1/L2 CCH, and uses those resources (that is, codes and frequencies) to transmit the A/N signal to the base station. However, in the case of the L1/L2 CCH occupying a plurality of continuous CCEs, the terminal uses an A/N resource corresponding to the CCE having the smallest index of a plurality of PUCCH constituent resources corresponding to a plurality of CCEs (that is, the A/N resource that has been associated with the CCE having a CCE index that is even number) to transmit the A/N signal to the base station. Specifically, the A/N resource number $n_{PUCCH}$ is established by the following equation (equation 1) (e.g., see Non-Patent Literature 3).

[1]

$$n_{PUCCH}=N+n_{CCE} \quad \text{(Equation 1)}$$

In this case, the above-noted A/N resource number $n_{PUCCH}$ is the above-described A/N resource number, N is the A/N resource offset value given in common within the cell, and $n_{CCE}$ is the number of the CCE onto which the PDCCH is mapped. According to equation 1, it can be seen that, in accordance with the range that can be taken by $n_{CEE}$, an A/N resource within a certain range can be used. In the following, the A/N that determines the resources dependent upon the control information scheduling of the PDCCH in this manner will be noted as D-A/N (dynamic A/N (dynamic ACK/NACK)).

As described above, the A/N resources include frequency resources in addition to code resources. Because the PUCCH and the PUSCH use the same frequency band in the uplink, there is a tradeoff between the region of the PUCCH that includes the D-A/N and the bandwidth of the PUSCH.

CITATION LIST

Non-Patent Literature

NPL 1
3GPP TS 36.211 V10.4.0, "Physical Channels and Modulation (Release 10)," December 2011
NPL 2
3GPP TS 36.212 V10.4.0, "Multiplexing and channel coding (Release 10)," December 2011
NPL 3
3GPP TS 36.213 V10.4.0, "Physical layer procedures (Release 10)," December 2011

BRIEF SUMMARY

Technical Problem

Because the PDCCH has a limited region for the assignment of control information, the number of terminals and amount of control information that can be assigned simultaneously is limited. Also, the PDCCH is supposed to be received in accordance with cell-specific parameters. Because the PDCCH is dependent on the cell-specific parameters, there is a problem in that the PDCCH is not suitable for CoMP (coordinated multipoint) operation in which there is coordination between a plurality of cells or an HetNet (heterogeneous network) in which pico base stations are disposed and operated within a cell formed by a macro base station. In this respect, the adoption of an E-PDCCH (enhanced PDCCH (enhanced downlink control channel)) as a new control channel different from the PDCCH, is under discussion in Rel.11.

Adoption of the E-PDCCH enables an increase in the region to which control information is allocated. Additionally, the E-PDCCH has the advantage of enabling flexible control information allocation that is not restricted by the settings in units of cells. For this reason, adoption of the E-PDCCH is expected to enable operation suitable in particular for CoMP, in which coordination is made between cells, and for HetNet, in which inter-cell interference control is important.

When the E-PDCCH is adopted, however, unless some measure is taken, it is assumed that collision can occur in the uplink A/N between a terminal controlled by the E-PDCCH control information and a terminal controlled by the PDCCH control information. Alternatively, a problem can be assumed in which the PUSCH band is reduced, if excessive A/N resources are reserved wastefully to prevent A/N collision.

An object of the present invention is to provide a radio communication terminal, a base station apparatus, and a resource allocation method that, while preventing A/N collision, increase the A/N resource utilization efficiency and that cause no unnecessary reduction of the PUSCH band in a system that transmits E-PDCCH control information.

Solution to Problem

A radio communication terminal according to an aspect of the present invention includes: a receiving section that receives a control signal including an ACK/NACK index via an enhanced physical downlink control channel (E-PDCCH) transmitted using one configuration from among one or a plurality of configuration candidates; a control section that selects a resource to be used for an ACK/NACK signal of downlink data from among specified resources specified beforehand, based on E-PDCCH configuration information used for transmission or reception of the E-PDCCH and the ACK/NACK index; and a transmitting section that transmits the ACK/NACK signal using the selected specified resource.

A base station apparatus according to an aspect of the present invention includes: a control section that determines a resource for transmitting an ACK/NACK signal in response to downlink data from a radio communication terminal from among specified resources specified beforehand, based on a configuration used for transmission of an E-PDCCH out of one or a plurality of E-PDCCH configurations indicated beforehand to the radio communication terminal and an ACK/NACK index included in a control signal; and a transmitting section that transmits the control signal including the ACK/NACK index indicating the determination result of the control section via the E-PDCCH using the configuration corresponding to the determined specified resource.

A resource allocation method according to an aspect of the present invention includes: receiving a control signal including an ACK/NACK index via an enhanced physical downlink control channel (E-PDCCH); and selecting one of specified resource candidates specified beforehand from among a plurality of ACK/NACK resources separated from each other in frequency and code regions, based on the ACK/NACK index and a configuration of the E-PDCCH.

Advantageous Effects of Invention

According to the present invention, in the case where control information is transmitted using the enhanced physical downlink control channel and the physical downlink control channel, it is possible to increase the A/N resource utilization efficiency and to avoid an unnecessary reduction of the PUSCH band while avoiding collision between A/N signals for downlink data.

BRIEF DESCRIPTION OF THE SEVERAL VIEWS OF THE DRAWINGS

FIGS. 4A to 4C are drawings showing an example of the subframe configuration of the downlink at the time of E-PDCCH transmission;

FIG. 7 is a drawing showing examples in which different A/N resources are allocated to four E-PDCCH terminals, respectively;

FIG. 12 is a drawing showing an example of E-PDCCH scheduling in Embodiment 1;

FIGS. 13A and 13B are drawings describing A/N resources of an E-PDCCH terminal switched based on an ARI according to Embodiment 1;

FIGS. 15A and 15B are drawings showing the subframe configuration of the downlink according to Embodiment 2;

FIG. 16 is a drawing showing an example of E-PDCCH scheduling in Embodiment 2;

FIG. 20 is a drawing showing an example of E-PDCCH scheduling in Embodiment 3;

FIG. 23 is a drawing showing an example of E-PDCCH scheduling in Embodiment 4;

FIG. 30 is a drawing showing an example of E-PDCCH scheduling in Embodiment 7.

DETAILED DESCRIPTION

Embodiments of the present invention will be described in detail below with references made to the drawings.

Embodiment 1

<Background of Obtaining an Embodiment of the Present Invention>

First, before describing the specific configuration and operation of Embodiment 1, one method that the inventors of the present invention have noticed as a method for allocating A/N resources in the case of adopting the E-PDCCH will be described.

Figure 1:
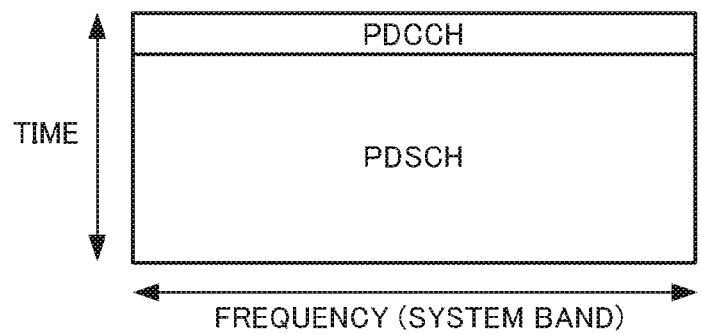
FIG. 1 is a drawing showing the subframe configuration of the downlink.
Figure 2:
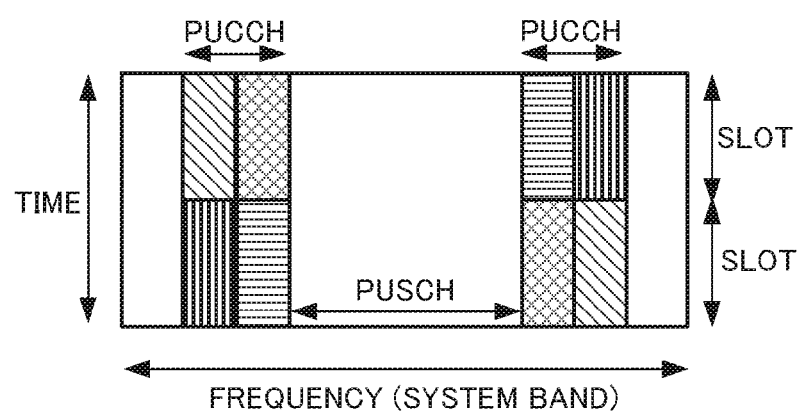
FIG. 2 is a drawing showing the subframe configuration of the uplink.
Figure 3:
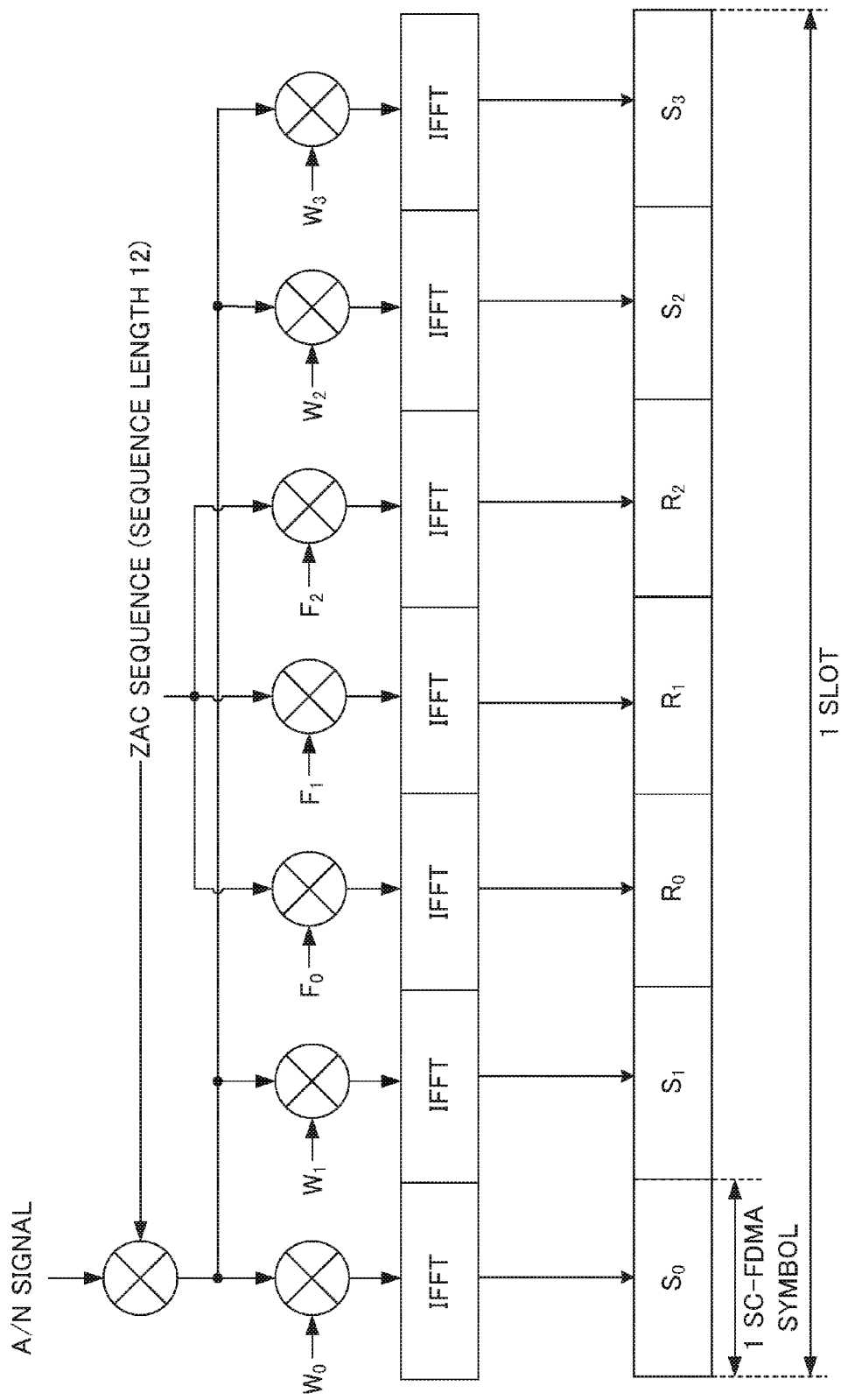
FIG. 3 is a drawing describing the method of spreading of the A/N signal in the PUCCH formats 1a/1b.
Figure 5:
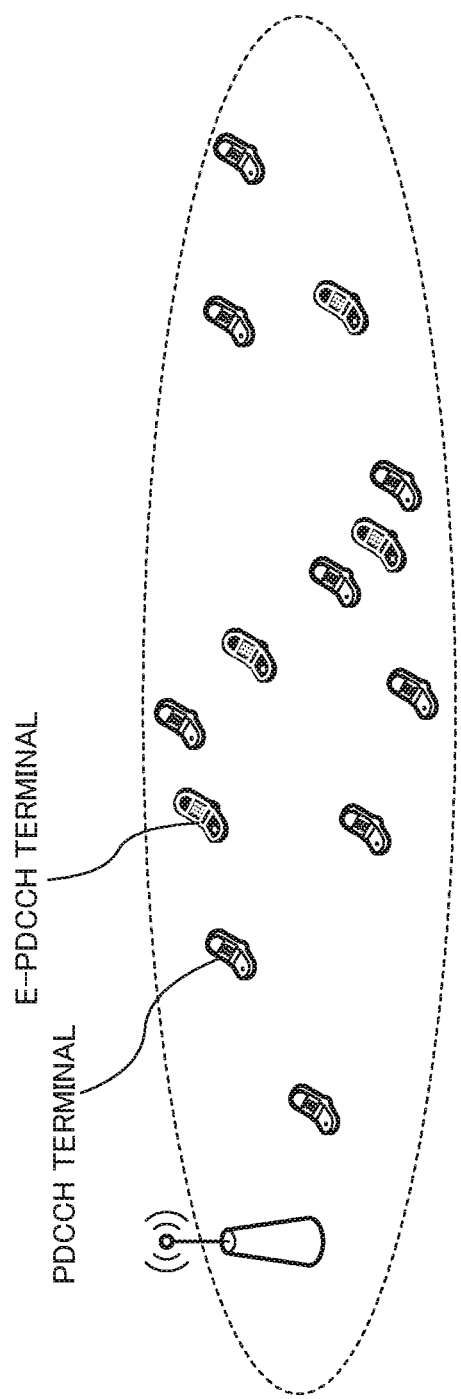
FIG. 5 is a drawing showing the system configuration when E-PDCCH is adopted.

FIGS. 4A to 4C show an example of the downlink subframe at the time of E-PDCCH transmission. FIG. 5 shows the system configuration when E-PDCCH is adopted.

An E-PDCCH has some or all of the following features.

(1) Unlike a PDCCH transmitted using resources common to all terminals, the E-PDCCH is transmitted using a frequency resource block allocated to each terminal.

(2) Unlike the PDCCH demodulated using a reference signal common to all terminals in a cell, the E-PDCCH is demodulated using a terminal-specific reference signal given to each terminal.

(3) Unlike the PDCCH scrambled using a scramble code common to all terminals in the cell, the E-PDCCH is scrambled using a scramble code given to each terminal.

(4) Whether or not to transmit the E-PDCCH can be changed by a setting.

As shown in FIGS. 4A to 4C, unlike the PDCCH transmitted using resources common to all terminals, a frequency resource block (PRB) is set for each terminal and the E-PDCCH is transmitted using the PRB. In the example of FIGS. 4A to 4C, PRB numbers 2, 4, . . . , 24, 26 are set as E-PDCCHs. Each E-PDCCH is composed of one or a plurality of resource eCCEs (enhanced control channel elements). The relationship between an eCCE number and a PRB number is not defined yet, but in consideration of the fact that the E-PDCCH is set for each terminal, the following relationship can be assumed.

(1) Numbering such that different eCCE numbers are assigned to all PRBs in entire system band (FIG. 4A)

(2) Numbering such that all eCCE numbers are different in one or a plurality of PRB sets with which E-PDCCHs set for each terminal are transmitted (FIG. 4B)

(3) Numbering such that all eCCE numbers are different in each PRB irrespective of set PRBs (FIG. 4C)

Furthermore, as shown in FIG. 5, in a communication system adopting the E-PDCCH, it is expected that PDCCH terminals and E-PDCCH terminals are mixed within one cell (the E-PDCCH terminals in FIG. 5 being shown in black). In this case, a PDCCH terminal is a terminal that receives PDCCH control information for controlling its communication, and an E-PDCCH terminal is a terminal that receives E-PDCCH control information for controlling its communication.

Therefore, adopting the E-PDCCH enables flexible control information assignment without restriction by the setting in units of cells in addition to increasing the region of the control information. For example, a plurality of E-PDCCHs with different settings within a cell can be used or E-PDCCHs with the same setting between cells can be used. For this reason, adoption of the E-PDCCH is expected to enable operation suitable in particular for CoMP, in which coordination is made between cells, and for HetNet, in which inter-cell interference control is important.

On the other hand, no method has been defined so far for determining A/N feedback resources in response to the PDSCH to which E-PDCCH is allocated as control information.

The simplest method is to establish the A/N resource number as shown in the following equation 2, for example, using the E-PDCCH, similar to the PDCCH.

[2]

$$n_{PUCCH}^{E\text{-}PDCCH} = f(N_e, n_{eCCE}) \quad \text{(Equation 2)}$$

In the above, $n_{PUCCH}^{E\text{-}PDCCH}$ is the resource number with which the E-PDCCH terminal transmits the A/N, $N_e$ is the A/N resource offset value, and $n_{eCCE}$ is the number of the eCCE to which the E-PDCCH is mapped. Also, $N_e$ is the D-A/N resource offset parameter, and this may be a cell-specific value, or a value given independently for each terminal individually. The function $f(a, b)$ is $f(a, b)=a+b$, for example.

Figure 6:
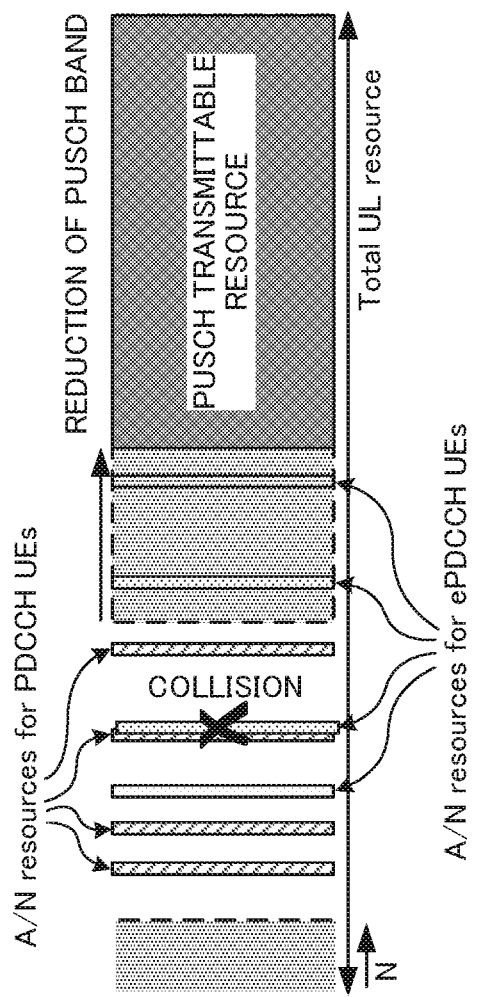
FIG. 6 is a drawing showing examples in which the D-A/N region for a PDCCH terminal and the D-A/N region for an E-PDCCH terminal are set.

This method has the advantage of not requiring notification of the A/N resource to each terminal, and also having no possibility of A/N collision between E-PDCCH terminals. On the other hand, the method has the disadvantage that A/Ns of the E-PDCCH terminal are distributed over a wide range and A/Ns collide with each other between a plurality of terminals, generating an allocation block. FIG. 6 shows this situation.

FIG. 6 illustrates an example of a case where A/N resources for the PDCCH terminal and A/N resources for the E-PDCCH terminal are set, four A/N resources each. Suppose the A/N resources for the PDCCH terminal are determined according to conventional equation 1. On the other hand, suppose the A/N resources for the E-PDCCH terminal are determined according to equation 2.

First, determining A/N resources of the E-PDCCH terminal using the eCCE number results in a problem that A/N resources are distributed over a wide range. The degree of distribution differs depending on the range of values that can be taken by the eCCE number and equation 2. For example, when eCCE numbering as shown in FIG. 4A is done, the degree of distribution of A/N resources becomes very large, which may reduce the bandwidth in which the PUSCH should originally be transmitted. This may lead to deterioration of the uplink throughput.

Moreover, there is also a problem that A/N resources collide with each other. FIG. 6 shows a situation in which A/N collision occurs between the PDCCH terminal and the E-PDCCH terminal. Actually, a plurality of E-PDCCHs may be set within a cell and A/N collision may occur also between different E-PDCCHs in this case. Collision deteriorates the A/N quality significantly and is never acceptable, and therefore when collision occurs in A/N resources between a plurality of terminals, allocation needs to be given up. On the other hand, it is possible to attempt to avoid an allocation block by rescheduling PDCCH or E-PDCCH among a plurality of terminals, which would, however, require scheduling of both downlink control signals and uplink A/N signals to be simultaneously adjusted, and implementation thereof will require a complicated system and algorithm. Moreover, when one of the arrangement of the downlink control signal and the uplink A/N resource is determined, the other one is automatically determined, and it is therefore difficult to perform scheduling so that the arrangement of both becomes appropriate from the standpoint of the allocation block probability or resource utilization efficiency.

Another method is a method of using RRC (radio resource control) information or the like to allocate A/N resources to each terminal beforehand.

Figure 7:
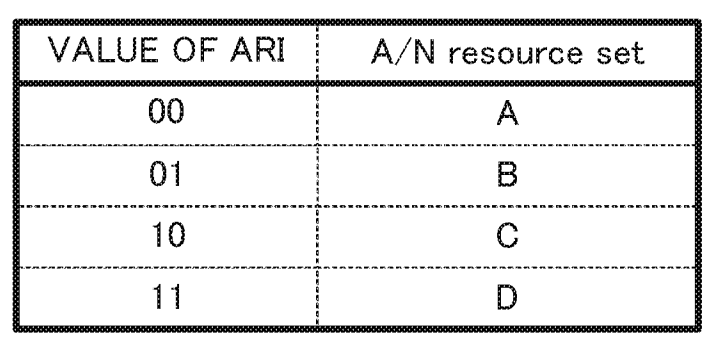

As the A/N resource determination method when more A/N bits need to be fed back at the time of carrier aggregation or the like, Rel.10 has adopted a method of setting four A/N resource candidates by RRC and dynamically selecting A/N resources in subframe units using a 2-bit ARI (ACK/NACK resource indicator) included in the PDCCH (Non-Patent Literature 3). FIG. 7 is a table that associates A/N resources candidates set according to RRC control information with ARI values. The terminal determines A/N resources based on a value indicated by the ARI of the decoded PDCCH.

Adopting an ARI also to an E-PDCCH and selecting A/N resources in the same way as that described above allows an A/N resource setting independent of E-PDCCH scheduling. In this case, the same A/N resource candidate may be set for a plurality of E-PDCCH terminals and A/N resources may be controlled by an ARI of E-PDCCH transmitted to each terminal. Since there are a plurality of alternatives, it is possible to avoid A/N resources of the PDCCH terminal and A/N resources of a terminal for which a different E-PDCCH is set, and an allocation block. Moreover, since the allocation block can be avoided by adjusting the ARI, it is unnecessary to readjust scheduling of PDCCH and E-PDCCH.

However, in the selection of A/N resources using the ARI, it is possible to set only A/N resource candidates corresponding in number to bits of the ARI. In the case where the ARI has, for example, 2 bits, the number of selectable A/N resources is 4. In consideration of a possibility that collision in A/N resources may occur with PDCCH terminals or terminals for which other E-PDCCHs are set, there is also a possibility that some of the four A/N resources may not be able to be used. For this reason, there is a problem that the ARI alone provides too small a number of alternatives to perform flexible A/N resource control.

The number of A/N resource candidates can be increased by increasing the number of bits of the ARI. However, an excessive increase in the number of ARI bits may lead to an increase of overhead of the E-PDCCH, and is therefore not desirable from the viewpoint of performance and coverage.

Thus, an object of the communication system according to Embodiment 1 is to simultaneously achieve two objectives: (1) preventing the number of bits of the ARI from increasing and (2) increasing the number of A/N resource candidates.

[Overview of Communication System]

The communication system of Embodiment 1, as shown in the example of FIG. 5, includes one base station 100 and a plurality of terminals 200 or the like within a cell.

[Configuration of Base Station 100]

Figure 8:
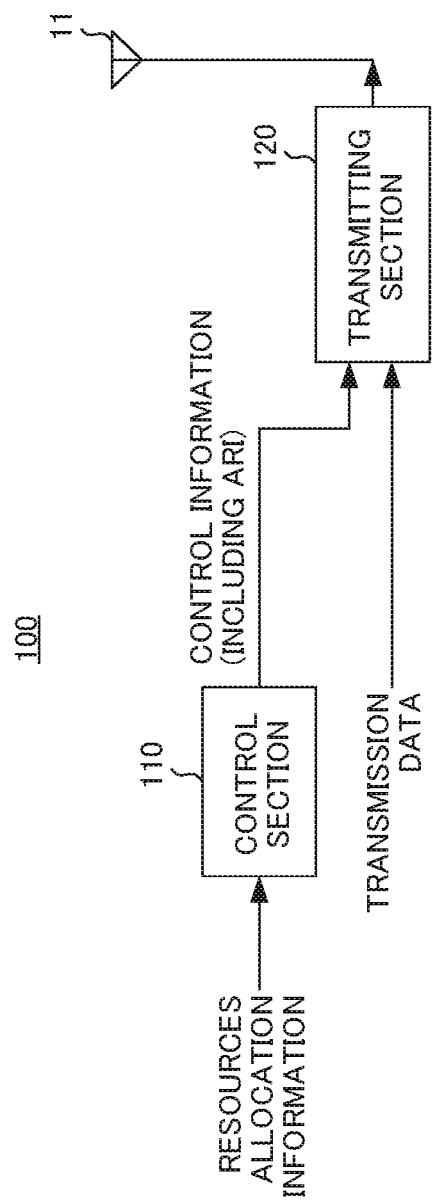
FIG. 8 is a block diagram showing the main parts of a base station of Embodiment 1.

FIG. 8 is a block diagram showing the main parts of base station 100.

Base station 100, as shown in FIG. 8, has control section 110 that generates a plurality of pieces of control information to be transmitted to a plurality of terminals 200, respectively, and transmitting section 120 that converts control information and transmission data to a radio transmission signal and transmits the signal by radio via antenna 11.

Control section 110 generates control information for each terminal 200 from downlink resource allocation information or the like. Control section 110 schedules control information to be transmitted to each terminal 200 in the PDCCH or E-PDCCH. At this time, the E-PDCCH is transmitted in one configuration out of one or a plurality of configurations set beforehand for terminal 200. The E-PDCCH terminal is notified of which of notification A/N resource candidates previously specified through RRC notification is used to transmit A/N using the ARI included in the E-PDCCH. Therefore, control section 110 generates control information of the E-PDCCH terminal including the ARI and outputs the control information to transmitting section 120.

Transmitting section 120 transmits, by radio, the signals through the channels, which include transmission data and control data. That is, transmitting section 120 transmits, respectively, transmission data by the PDSCH, PDCCH terminal control information by the PDCCH, and E-PDCCH terminal control information by the E-PDCCH.

Figure 9:
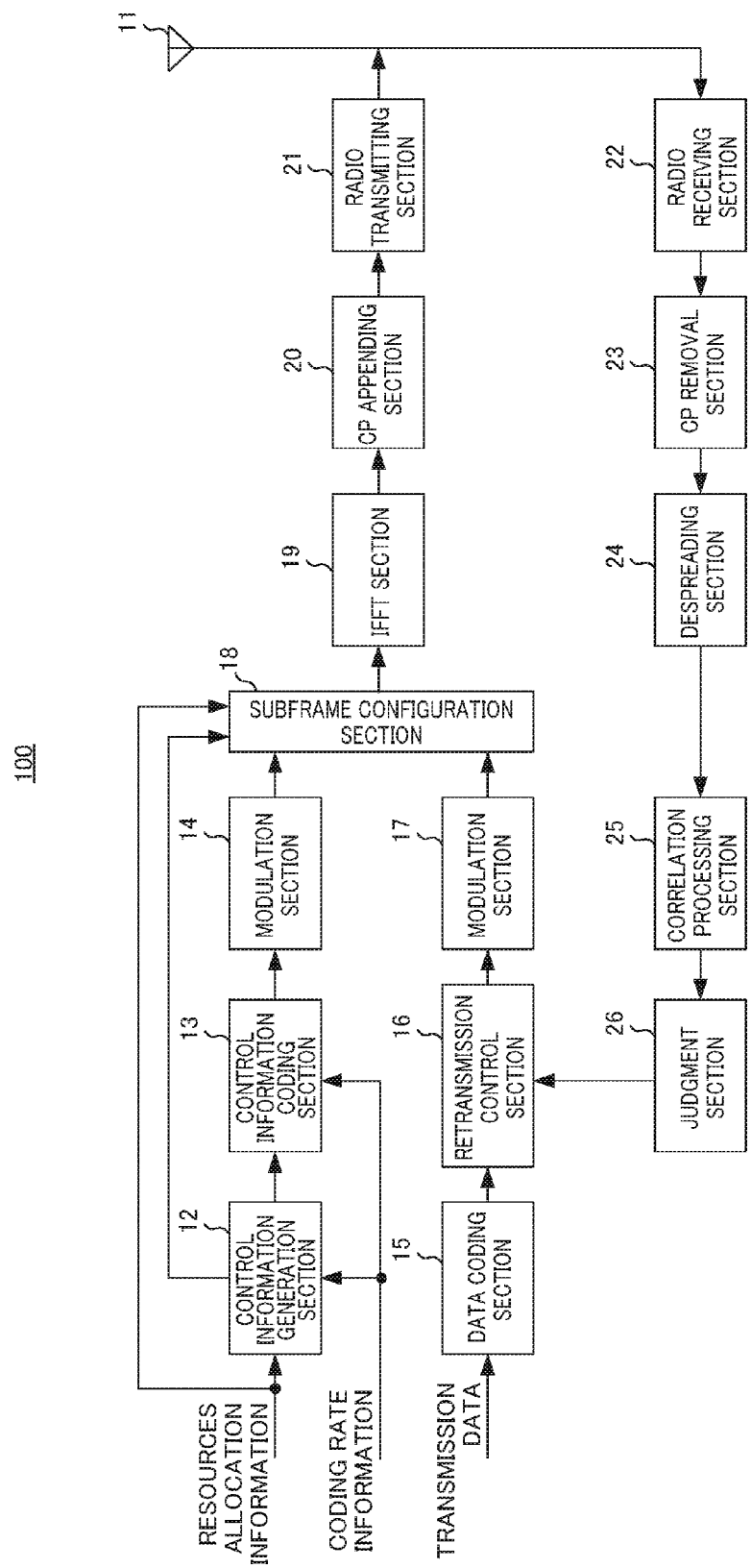
FIG. 9 is a block diagram showing the details of the base station of Embodiment 1.

FIG. 9 is a block diagram showing the details of the base station 100.

In detail, base station 100, as shown in FIG. 9, includes antenna 11, control information generation section 12, control information coding section 13, modulation sections 14 and 17, data coding section 15, retransmission control section 16, subframe configuration section 18, IFFT section 19, CP appending section 20, radio transmitting section 21, and the like. Base station 100 also includes radio receiving section 22, CP removal section 23, despreading section 24, correlation processing section 25, judgment section 26, and the like.

Of these constituent elements, control information generation section 12 functions mainly as control section 110, and the constituent elements from control information coding section 13 to radio transmitting section 21 and data coding section 15 to radio transmitting section 21 function mainly as transmitting section 120.

Base station 100 transmits the PDCCH, the E-PDCCH, and the PDSCH on the downlink. Base station 100 also receives the PUCCH carrying the A/N signal on the uplink. In this case, to avoid having the description become complex, the constituent elements related to the downlink transmission of the PDCCH, E-PDCCH, and PDSCH, which are closely connected with the features of the present embodiment, and the uplink reception of the PUCCH with respect to that downlink data are mainly shown. The constituent elements related to uplink data reception are omitted in the illustration and descriptions.

The downlink control signal and data signal generated by base station 100 are each separately encoded, modulated, and inputted to subframe configuration section 18.

First, the generation of the control signal will be described. Control information generation section 12 generates the control information for each terminal 200, from the resource allocation results (resource allocation information) and the coding rate information of each terminal 200 for which downlink allocation is to be done. The control information for each terminal 200 includes terminal ID information indicating for which terminal 200 the control information is intended. For example, the CRC bit masked by the ID number of terminal 200 that is the control information notification destination is included in control information as the terminal ID information. In this case, different information is included in the control information mapped onto the PDCCH and the control information mapped onto the E-PDCCH. In particular, ARI indicating which A/N resource candidate notified beforehand using RRC is to be used is included in the control information mapped onto the E-PDCCH. The generated control information for each terminal 200 is inputted to control information coding section 13.

Control information coding section 13 independently encodes the control information for each terminal 200 based on the coding rate information. The encoding may be done with the control information mapped onto the PDCCH and the control information mapped onto the E-PDCCH being either same or different. The output of control information coding section 13 is inputted to modulation section 14.

Modulation section 14 independently modulates the control information of each terminal 200. The modulation may be done with the control information mapped onto the PDCCH and the control information mapped onto the E-PDCCH being either same or different. The output of modulation section 14 is inputted to subframe configuration section 18.

Next, the generation of the data signal will be described. Data coding section 15 appends a CRC bit that is masked based on the ID of each terminal 200 to the data bit stream transmitted to each terminal 200 and performs error correction coding. The output of data coding section 15 is inputted to retransmission control section 16.

Retransmission control section 16 holds the coded transmission data for each terminal 200 and outputs the transmission data to modulation section 17 at the time of the first transmission. With respect to terminal 200 to which the NACK signal has been inputted from judgment section 26, that is, terminal 200 that will perform retransmission, retransmission control section 16 outputs the transmitted data for retransmission to modulation section 17.

Modulation section 17 performs data modulation of each of the data coded sequences for each terminal 200. The modulated streams are inputted to subframe configuration section 18.

Subframe configuration section 18 maps the inputted control information sequences and data sequences onto resources divided by the time and frequency of a subframe based on the resource allocation information. By doing this, subframe configuration section 18 configures and outputs subframes to IFFT section 19.

IFFT section 19 performs an IFFT (inverse fast Fourier transform) on the transmission subframes that are inputted thereto, thereby obtaining a time waveform, which is inputted to CP appending section 20.

CP appending section 20 appends a CP to each OFDM symbol within the subframe and outputs the result to radio transmitting section 21.

Radio transmitting section 21 performs radio modulation of the inputted symbols to the carrier frequency band and transmits the modulated downlink signal via antenna 11.

Radio receiving section 22 receives, as input, an A/N signal of terminal 200 from antenna 11 and performs radio demodulation on the input signal. The demodulated downlink signal is inputted to CP removal section 23.

CP removal section 23 removes the CP from each SC-FDMA (single carrier-frequency-division multiple access) symbol within the downlink signal. After removal of the CPs, the symbols are inputted to despreading section 24.

In order to extract the A/N of the target terminal 200 from the A/N signals of a plurality of terminals 200 that have been code multiplexed, despreading section 24 performs despreading by a corresponding orthogonal code. The despread signal is outputted to correlation processing section 25.

Correlation processing section 25 performs correlation processing by a ZAC sequence in order to extract the A/N. The signal after correlation processing is inputted to judgment section 26.

Judgment section 26 judges whether the A/N of terminal 200 is ACK or NACK. If the judgment result indicates ACK, judgment section 26 prompts retransmission control section 16 to transmit the next data. If, however, the judgment result indicates NACK, judgment section 26 prompts retransmission control section 16 to perform retransmission.

[Configuration of Terminal 200]

Figure 10:
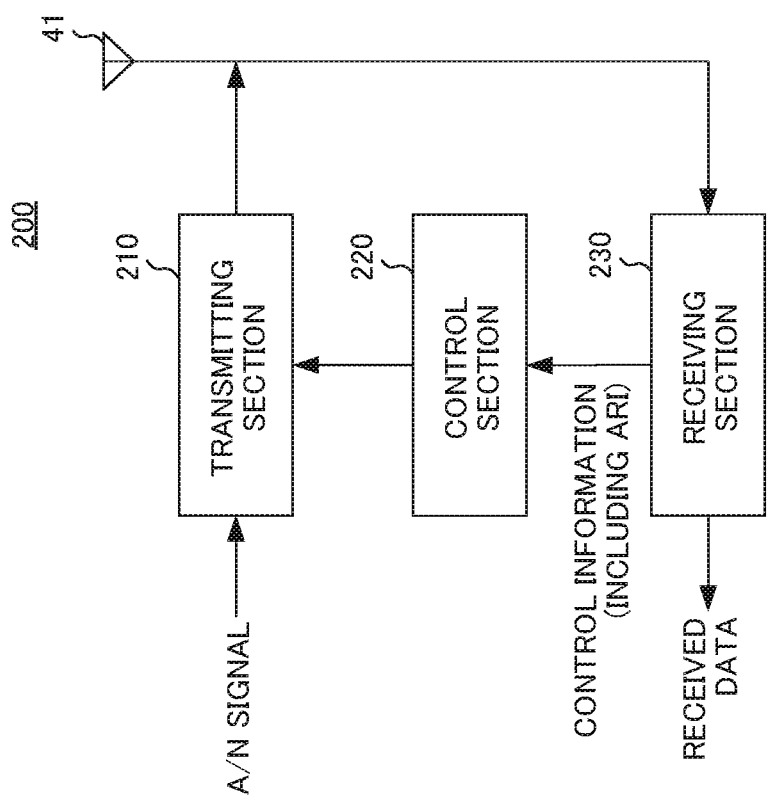
FIG. 10 is a block diagram showing the main parts of a terminal in Embodiment 1.

FIG. 10 is a block diagram showing the main parts of a terminal.

Terminal 200 includes receiving section 230 that receives control information and downlink data via antenna 41, control section 220 that determines the resource used for transmitting the A/N signal, based on the control information, and transmitting section 210 that transmits the A/N signal using the determined resource.

If terminal 200 is set to receive E-PDCCH control information, terminal 200 becomes an E-PDCCH terminal, and if terminal 200 is set to receive PDCCH control information, terminal 200 becomes a PDCCH terminal. Terminal 200 may also be set to receive both. That is, terminal 200 set to receive both attempts to receive control information from both E-PDCCH and PDCCH, and if terminal 200 can extract control information of terminal 200 itself from the E-PDCCH, terminal 200 becomes an E-PDCCH terminal and if terminal 200 can extract control information of terminal 200 itself from the PDCCH, terminal 200 becomes a PDCCH terminal. If terminal 200 receives no particular notification or specification, terminal 200 becomes a PDCCH terminal.

Furthermore, terminal 200 is notified of the configuration of the E-PDCCH in which control information of terminal 200 itself may be possibly included from a higher layer such as RRC. The number of such configurations may be one or plural. When E-PDCCHs of a plurality of configurations are set, terminal 200 examines which of the respective configurations is used to transmit the E-PDCCH of terminal 200 itself. Base station 100 transmits the E-PDCCH to terminal 200 using one of the configurations.

Receiving section 230 receives received data via the PDSCH, and control information via the E-PDCCH or PDCCH. That is, in the case of E-PDCCH terminal 200, receiving section 230 receives control information including an ARI via the E-PDCCH, and in the case of PDCCH terminal, receives control information via the PDCCH. Receiving section 230 outputs the received control information to control section 220.

In the case of E-PDCCH terminal 200, control section 220 identifies which of the A/N resources (RRC notification A/N resources) notified using RCC or the like is used as an A/N signal transmission resource of received data based on the two: the configuration of the received E-PDCCH and the value of the ARI. In the case of PDCCH terminal 200, control section 220 determines the A/N signal transmission resource in the same manner as a conventional PDCCH terminal. Control section 220 outputs the details of the determination to transmitting section 210.

Transmitting section 210 uses the determined resource to transmit the A/N signal of the received data by radio.

Figure 11:
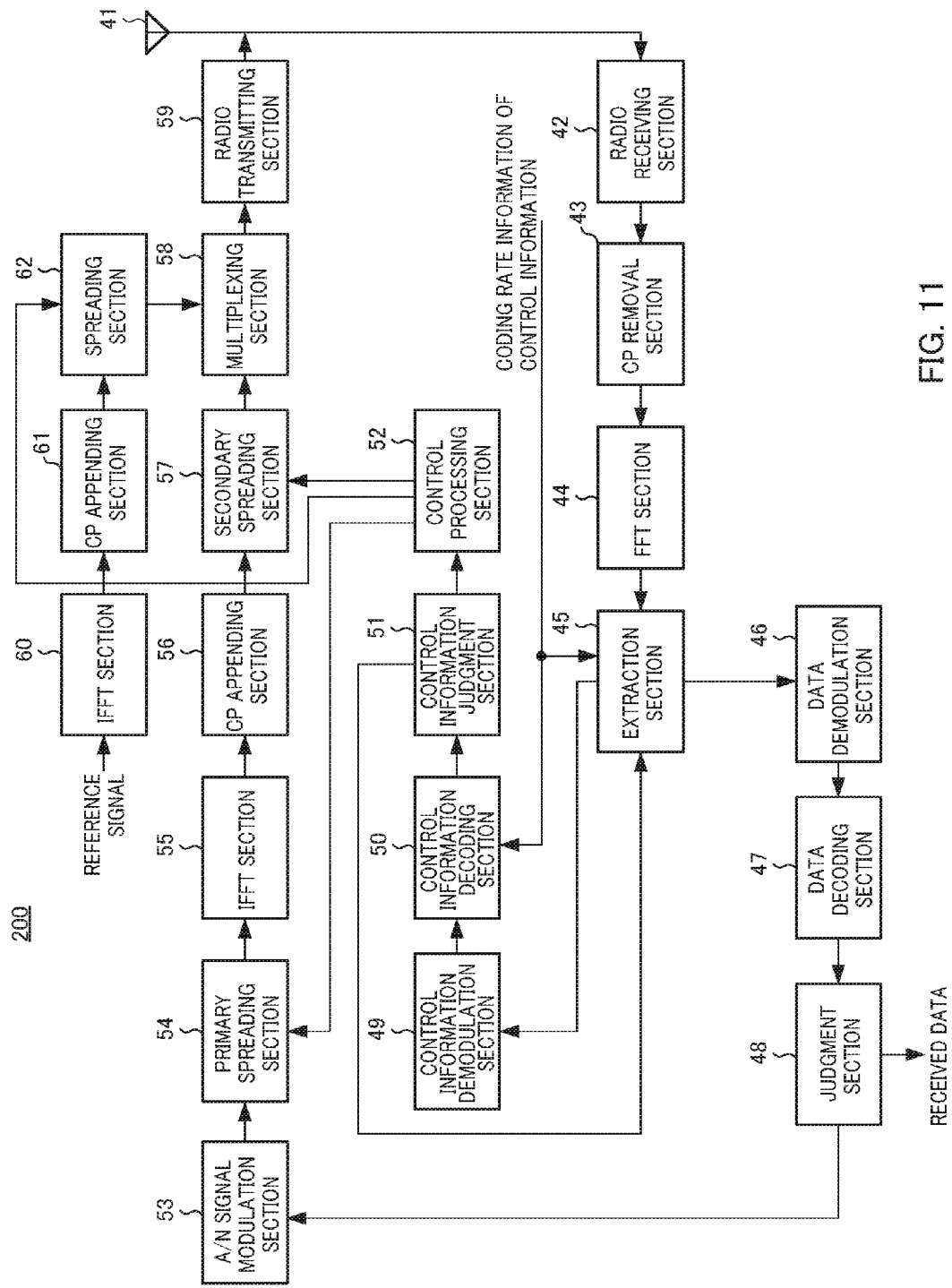
FIG. 11 is a block diagram showing the details of the terminal in Embodiment 1.

FIG. 11 is a block diagram showing the details of a terminal.

As shown in FIG. 11, specifically, terminal 200 includes antenna 41, radio receiving section 42, CP removal section 43, FFT section 44, extraction section 45, data demodulation section 46, data decoding section 47, judgment section 48, control information demodulation section 49, control information decoding section 50, control information judgment section 51, control processing section 52, A/N signal modulation section 53, primary spreading section 54, IFFT section 55, CP appending section 56, secondary spreading section 57, multiplexing section 58, and radio transmitting section 59. Terminal 200 also includes IFFT section 60, CP appending section 61, and spreading section 62.

Of the above constituent elements, control processing section 52 mainly functions as control section 220. Constituent elements from A/N signal modulation section 53 to radio transmitting section 59 mainly function as transmitting section 210, and constituent elements from radio receiving section 42 to judgment section 48 and from radio receiving section 42 to control information judgment section 51 mainly function as receiving section 230.

Terminal 200 receives, on the downlink, control information mapped onto the PDCCH or E-PDCCH, and downlink data mapped onto the PDSCH. Terminal 200 transmits the PUCCH on the uplink. In this case, to avoid having the description become complex, only the constituent elements related to downlink reception (specifically, PDCCH, E-PDCCH, and PDSCH), which are closely connected with the features of the present embodiment, and related to the uplink transmission (specifically, PUCCH) with respect to the downlink received data are indicated.

Radio receiving section 42 inputs the input from antenna 41 that has received the downlink signal transmitted from the base station, performs radio demodulation, and outputs the demodulated signal to CP removal section 43.

CP removal section 43 removes the CP from each OFDM symbol time waveform within the subframe and outputs the result to FFT section 44.

FFT section 44 performs an FFT (fast Fourier transform) on the received time waveform in order to perform OFDM (orthogonal frequency division multiplexing) demodulation, thereby obtaining a subframe in the frequency domain. The obtained received subframe is inputted to extraction section 45.

Extraction section 45 extracts the control information intended for the terminal itself from either the PDCCH region or the E-PDCCH region. Information indicating in which one of the PDCCH and the E-PDCCH the control information is included is specified beforehand from base station 100 (not shown). Extraction section 45 extracts one or a plurality of control information candidates from a control information region onto which the control information of the terminal itself is possibly mapped using the coding rate information of the control information, and outputs the candidate to control information demodulation section 49. When a result is obtained from control information judgment section 51, extraction section 45 extracts a data signal intended for the terminal from the received subframe based on the resource allocation result included in the control information intended for the terminal. The obtained data signal is inputted to data demodulation section 46.

Control information demodulation section 49 demodulates one or more pieces of inputted control information and outputs the result to control information decoding section 50.

Control information decoding section 50 decodes one or more inputted demodulated sequences using the coding rate information of the control information. The decoding result is inputted to control information judgment section 51.

Control information judgment section 51 judges, from the one or more decoding results, the control information intended for the terminal, using the terminal ID information. The judgment uses, for example, the CRC bit that is masked by the ID information of the terminal itself included in the control information. If there is control information intended for the terminal itself, control information judgment section 51 outputs that control information to extraction section 45. Control information judgment section 51 outputs the control information to control processing section 52.

Control processing section 52 operates differently between the case of PDCCH terminal 200 and the case of E-PDCCH terminal 200.

In the case of PDCCH terminal 200, control processing section 52 obtains the resource number of the A/N signal based on equation 1 from the number of the resource (CCE) onto which the control information is mapped. From the obtained A/N signal resource number, control processing section 52 determines the spreading codes used for primary spreading, secondary spreading, and the reference signal, and the frequency resource block (RB) transmitting the PUCCH. This information is inputted to primary spreading section 54, secondary spreading section 57, and to spreading section 62 of the reference signal.

On the other hand, in the case of E-PDCCH terminal 200, control processing section 52 determines which of the A/N resource candidates notified as RRC control information is used based on the two: the configuration of the received E-PDCCH and the value indicated by the ARI included in the control information. In this case, it is assumed that the RRC notification A/N resource is specified to terminal 200 by base station 100 beforehand (not shown). Control processing section 52 determines each spreading code used for primary and secondary spreading and the reference signal corresponding to the specified A/N resource number, and the frequency resource block (RB) for transmitting the PUCCH. Control processing section 52 outputs the corresponding spreading code to primary spreading section 54, secondary spreading section 57, and the reference signal spreading section 62.

Data demodulation section 46 demodulates the inputted data signal intended for the terminal itself. The result of the demodulation is inputted to data decoding section 47.

Data decoding section 47 decodes the inputted demodulated data. The result of the decoding is inputted to judgment section 48.

Judgment section 48 uses the CRC masked by the ID of terminal 200 to judge whether or not the decoding result is correct. If the decoding result is correct, judgment section 48 outputs the ACK signal to A/N signal modulation section 53 and extracts the received data. If the decoding result is not correct, judgment section 48 outputs the NACK signal to A/N signal modulation section 53.

A/N signal modulation section 53, depending upon whether the input signal is ACK or NACK, generates modulated symbols having different values. The generated demodulated symbol is inputted to primary spreading section 54.

Primary spreading section 54 uses the ZAC sequence inputted from control processing section 52 to perform primary spreading of the A/N signal and outputs the A/N signal after primary spreading to IFFT section 55. In this case, because the cyclic shift value used for cyclic shift hopping differs in units of SC-FDMA, primary spreading section 54 uses a different cyclic shift value for each SC-FDMA symbol to perform primary spreading of the A/N signal.

IFFT section 55 performs an IFFT of each SC-FDMA symbol inputted from primary spreading section 54 and outputs the obtained time waveform to CP appending section 56.

CP appending section 56 appends a CP to each inputted SC-FDMA time waveform and outputs this signal to secondary spreading section 57.

Secondary spreading section 57 uses a block-wise spreading code sequence to perform secondary spreading of the SC-FDMA time waveform after the appending the CP. The spreading code used is a code specified by control processing section 52. The sequence that has been subjected to secondary spreading is inputted to multiplexing section 58.

Multiplexing section 58 time-multiplexes the two inputted sequences received as input from spreading section 62 for the reference signal and secondary spreading section 57, thereby generating a PUCCH subframe. The time multiplexed signal is inputted to radio transmitting section 59.

Radio transmitting section 59 performs radio modulation of the inputted signal to the carrier frequency band and transmits the uplink signal by radio from antenna 41.

IFFT section 60 performs IFFT on the reference signal and outputs the time waveform obtained to CP appending section 61.

CP appending section 61 appends a CP to the time waveform of the inputted reference signal and outputs this signal to spreading section 62.

Spreading section 62 spreads the time waveform with the CP. The spreading code used is a code specified by control processing section 52. The spread sequence is inputted to multiplexing section 58.

[Operation]

The processing flow of base station 100 and terminal 200 in Embodiment 1 will be described by step (1) through step (6).

FIG. 12 is a table showing the ARI included in the E-PDCCH and A/N resources determined by the E-PDCCH configuration.

Step (1): Before transmission or reception of a PDSCH, base station 100 notifies terminal 200 that can transmit control information using an E-PDCCH of the use of the E-PDCCH. Notification is not particularly necessary for terminal 200 that does not perform transmission using the E-PDCCH. When terminal 200 receives no notification or cannot recognize notification in particular, terminal 200 receives control information assuming that the control information is transmitted using the PDCCH. In addition, base station 100 notifies terminal 200 that may possibly transmit control information using the E-PDCCH of the configuration of the E-PDCCH which may be possibly used before transmission or reception of the PDSCH. For example, in FIG. 12, all of the three configurations are set for certain terminal 200, configuration A and configuration B are set for certain terminal 200, and only configuration A is set for certain terminal 200. In addition, base station 100 notifies A/N resource candidates determined by the ARI value and the E-PDCCH configuration before transmission or reception of the PDSCH. These A/N resource candidates are A to D, W to Z, and O to R in FIG. 12. An RRC control signal or the like is used for this notification.

Step (2): Base station 100 determines terminal 200 for assignment of data in each subframe and performs scheduling within the PDSCH. The scheduling uses, in addition to the amount of traffic to each terminal 200, the CSI feedback and sounding reference signal (SRS) transmitted by terminal 200 and the like.

Step (3): Base station 100 generates control information including the scheduling results intended for each terminal 200 and schedules the control information in the PDCCH or the E-PDCCH. Base station 100 determines a configuration in which the E-PDCCH is transmitted for terminals 200 for which a plurality of E-PDCCH configurations are set and performs scheduling based on the configuration.

Base station 100 confirms whether or not collision occurs in A/N resources between all terminals 200 for which control information is scheduled. When collision in A/N resources occurs, base station 100 examines whether or not collision in A/N resources can be prevented by changing the scheduling result of the PDCCH, the ARI value of the E-PDCCH and the E-PDCCH configuration or the like. In the case where collision in A/N resources cannot be avoided, base station 100 gives up scheduling for terminal 200 in which collision occurs (allocation block).

Step (4): When the control information scheduling for all terminals 200 is completed, base station 100 transmits, by radio, PDCCH and E-PDCCH control information and PDSCH downlink data using the downlink.

Step (5): Terminal 200 obtains from the received signal the control information intended for terminal 200 and extracts and decodes the data signal. Terminal 200 for which control information may have been transmitted using the E-PDCCH in particular also confirms in which configuration out of one or a plurality of usable configurations the control information has been transmitted. Furthermore, terminal 200 identifies the code and frequency resources for transmitting the A/N signal corresponding to the received data signal based on the control information. E-PDCCH terminal 200 in particular determines which of the A/N resource candidate notified beforehand by RRC is used based on the configuration of the E-PDCCH intended for the terminal and the value of the ARI included in the E-PDCCH.

Step (6): Terminal 200 identifies either ACK or NACK, in accordance with the judgment result of the data signal, and transmits the A/N signal using the A/N resources (code and frequency resources) identified as noted above.

[Effects]

As described above, according to base station 100 and terminal 200 of Embodiment 1, it is possible to increase the number of A/N resource candidates without increasing the number of ARI bits for terminal 200 for which a plurality of E-PDCCH configurations are set.

In addition, according to Embodiment 1, it is possible to gradually increase the number of A/N resource candidates as required by adding a configuration usable for the E-PDCCH terminal in accordance with the communication environment or terminal situation or the like.

In addition, according to Embodiment 1, A/N resource candidates, that is, A to D, W to Z, and O to R in FIG. 12 are all A/N resources notified beforehand using RRC control information or the like. Therefore, compared to the allocation method as shown in equation 2 whereby A/N resources are determined by resources for which E-PDCCH is scheduled such as eCCE number, base station 100 can easily adjust A/N resources. This allows the circuit scale of base station 100 to be reduced.

Modification Example 1

The communication system of Embodiment 1 can obtain similar effects also when the following modification is made thereto.

The number of ARI bits may be changed by the E-PDCCH configuration.

FIG. 13A and FIG. 13B show an example where the number of ARI bits differs depending on the configuration. FIG. 13A shows an example where only configuration A has a 2-bit ARI and other configurations have a 1-bit ARI. FIG.

13B shows an example where only configuration A has a 1-bit ARI and other configurations have a 2-bit ARI.

By so doing, it is also possible to obtain an effect of reducing overhead by reducing the number of ARI bits in addition to effects similar to those of Embodiment 1. For example, in an operation in which configuration A is frequently used for E-PDCCH, and configurations B and C are used only for fewer E-PDCCH terminals, fewer terminals 200 transmit E-PDCCH using configurations B and C, and it is thereby possible to increase the number of ARI bits of configuration A and reduce the number of ARI bits of configurations B and C. At this time, the overhead corresponding to ARI bits can be reduced, but since there are fewer E-PDCCH terminals of configurations B and C, it is possible to reduce deterioration of the allocation block rate obtained by reducing the number of ARI bits. On the other hand, while using the same operation, in an environment in which high priority is given to a reduction of overhead of the ARI bits rather than deterioration of the allocation block rate, the number of the ARI bits of configuration A may be conversely reduced and the number of the ARI bits of configurations B and C may be increased. It is thereby possible to achieve effects similar to those of Embodiment 1 and at the same time reduce the number of ARI bits of configuration A, reduce the number of information bits included in control information, and thereby improve receiving quality of E-PDCCH configuration A in which transmission or reception in various environments is assumed.

Modification Example 2

The communication system of Embodiment 1 can achieve the same effect even if the following changes are made thereto.

A range of A/N resource candidates specifiable by an ARI may be limited for each E-PDCCH configuration.

Figure 14A:
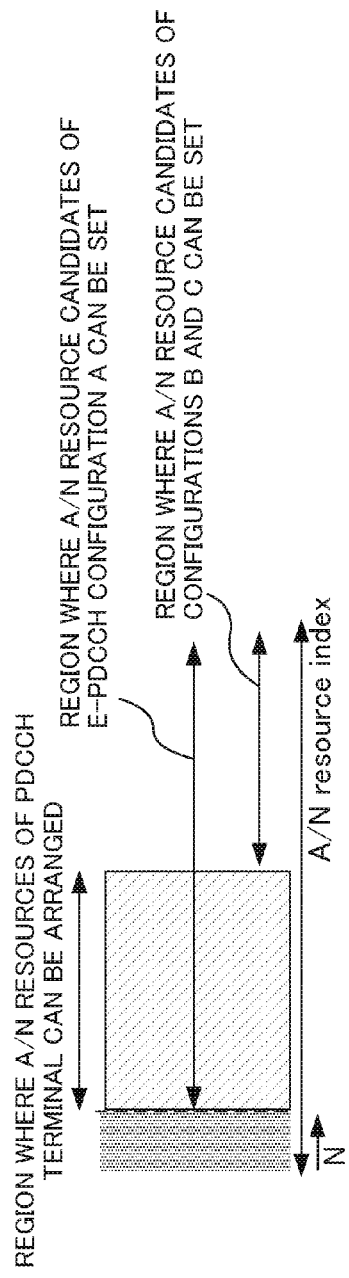
FIGS. 14A and 14B are drawings showing an A/N resource candidate setting range corresponding to the E-PDCCH configuration according to Embodiment 1.
Figure 14B:
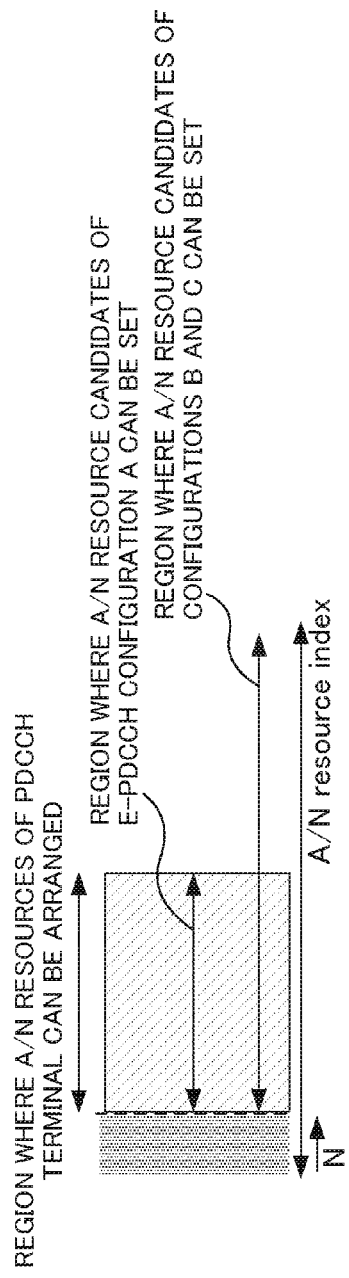

FIGS. 14A and 14B show an example where a range in which A/N resource candidates can be set by an E-PDCCH configuration is limited. In the example of FIG. 14A, the range of A/N resources in configurations B and C is limited to only a region different from the range of A/N resources of a PDCCH terminal and in the example of FIG. 14B, the range of A/N resources in configuration A is limited to the same region as the range of A/N resources of a PDCCH terminal.

By so doing, it is possible to obtain an effect of reducing overhead of an RRC control signal caused by limiting the A/N resource candidate settable range in addition to effects similar to those of Embodiment 1. For example, in an operation in which configuration A is a configuration frequently used for E-PDCCH, and configurations B and C are configurations only used for fewer E-PDCCH terminals, fewer terminals 200 transmit E-PDCCH using configuration B or C. Thus, by widening the A/N resource candidate settable range of configuration A and narrowing the A/N resource candidate settable range of configurations B and C, it is possible to reduce overhead of RRC while obtaining effects similar to those of Embodiment 1. On the other hand, while using the same operation, the A/N resource candidate settable range of configuration A may be narrowed and the A/N resource candidate settable range of configurations B and C may be widened. In this case, since configuration A is used which has a narrow setting range as long as no allocation block occurs, it is possible to secure resources allocatable to the PUSCH and improve uplink throughput.

Embodiment 2

[Overview of Communication System]

In Embodiment 2, E-PDCCHs are set as a PRB set composed of one or a plurality of PRBs for a terminal. In the terminal, E-PDCCHs are transmitted or received in the set PRB set.

Furthermore, one or a plurality of PRB sets of E-PDCCHs is/are set for each E-PDCCH terminal. Information on the set PRB set is notified from a base station to a terminal using RRC control information or the like. The number of the set PRB sets can be changed for each terminal.

FIGS. 15A and 15B illustrate examples where two PRB sets are set within a subframe. FIG. 15A illustrates an example where the two PRB sets have the same PRB frequency interval and FIG. 15B illustrate an example where the two PRB sets have different PRB frequency intervals. It is assumed in Embodiment 2 that such a PRB frequency interval is settable for each PRB set or every plurality of PRB sets. Note that a plurality of predetermined PRB sets may be defined and PRB sets to be used may be selected from among those PRB sets.

In the following, to avoid having the description become complex, constituent elements that are the same as in Embodiment 1 are assigned the same reference signs, and only the difference with respect to Embodiment 1 will be described.

[Configuration of Base Station]

The configuration of base station 100 differs from Embodiment 1 mainly in the difference in the processing done by control section 110, with other parts being the same as Embodiment 1. The details of the processing done by control section 110 will be described in detail in the description of operation to follow.

[Configuration of Terminal]

The configuration of terminal 200 differs mainly by the difference in the processing done by control section 220, with other parts being the same as in Embodiment 1. The details of the processing done by control section 220 will be described in detail in the description of operation to follow.

[Operation]

The processing flow of base station 100 and terminal 200 in Embodiment 2 will be described by step (1) through step (6).

FIG. 16 is a table showing the ARI included in the E-PDCCH and A/N resources determined by the PRB set.

Step (1): Before transmission or reception of the PDSCH, base station 100 notifies terminal 200 that can transmit control information using the E-PDCCH of the setting of the PRB set. Note that in the case of the PRB set that can be used for all E-PDCCH terminals, the setting thereof need not be notified. The setting of the PRB set to be notified and the number of PRB sets are determined for each terminal 200. For example, in FIG. 15, PRB sets A and B are set for certain terminal 200 and only PRB set A is set for certain terminal 200. Before transmission or reception of a PDSCH, base station 100 notifies A/N resource candidates determined by the ARI value and the PRB set of the E-PDCCH. The A/N resource candidates are A to D and W to Z in FIG. 16. An RRC control signal or the like is used for these notifications.

Step (2): Base station 100 determines terminal 200 to which data is assigned in each subframe and schedules it in the PDSCH. A CSI feedback or sounding reference signal (SRS) or the like transmitted by terminal 200 is used for scheduling in addition to the amount of traffic to each terminal 200.

Step (3): Base station 100 generates control information including the scheduling results intended for each terminal 200 and schedules it onto the PDCCH or the E-PDCCH. Base station 100 determines a PRB set for transmitting the E-PDCCH for terminal 200 for which a plurality of E-PDCCH PRB sets are set and performs scheduling in the PRB sets.

Base station 100 confirms whether or not collision in A/N resources occurs between all scheduled terminals 200. When collision in A/N resources occurs, base station 100 confirms whether or not it is possible to avoid collision in A/N resources by changing the scheduling results of the PDCCH, the ARI value of the E-PDCCH and PRB set of the E-PDCCH or the like. When collision in A/N resources cannot be avoided, base station 100 gives up scheduling for terminal 200 in which collision occurs (allocation block).

Step (4): When the mapping of control information in all terminals 200 is completed, base station 100 transmits, by radio, control information of the PDCCH and E-PDCCH and downlink data of the PDSCH on the downlink.

Figure 17:
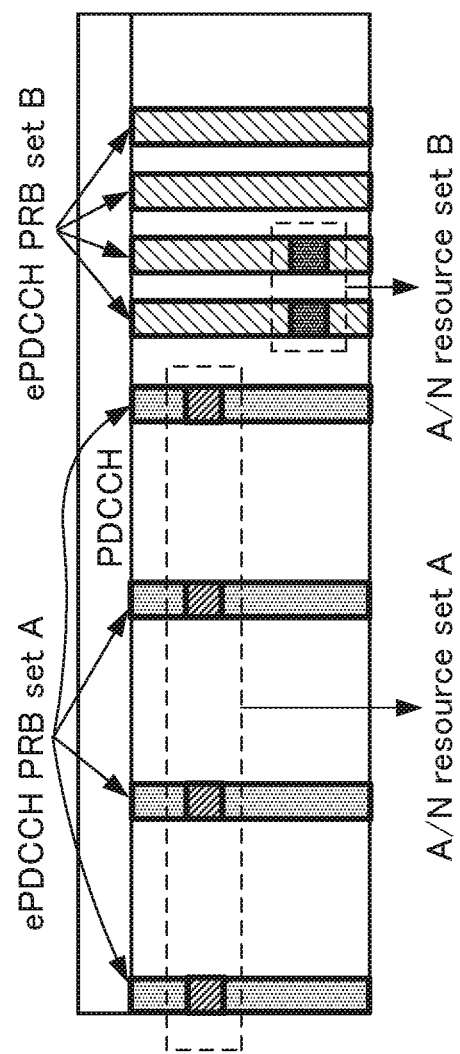
FIG. 17 is a drawing showing A/N resources identified based on a PRB set whereby E-PDCCH is transmitted according to Embodiment 2.

Step (5): Terminal 200 obtains from the received signal the control information intended for terminal 200 and extracts and decodes the data signal. Terminal 200 to which the control information might have been possibly transmitted using the E-PDCCH in particular also confirms by which PRB set out of one or a plurality of usable PRB sets the control information was transmitted. Terminal 200 identifies code and frequency resources for transmitting an A/N signal corresponding to the received data signal based on the control information. E-PDCCH terminal 200 in particular determines which of A/N resource candidates notified beforehand using RRC is used based on the PRB set whereby the E-PDCCH intended for the terminal itself is transmitted and the value of the ARI included in the E-PDCCH (e.g., see FIG. 17).

Step (6): Terminal 200 identifies either ACK or NACK, in accordance with the judgment result of the data signal, and transmits the A/N signal using the A/N resources (code and frequency resources) identified as noted above.

[Effects]

As described above, base station 100 and terminal 200 according to Embodiment 2 can increase the number of A/N resource candidates for terminal 200 for which a plurality of E-PDCCH PRB sets are set without increasing the number of ARI bits. According to Embodiment 2, since the number of A/N resource candidates selectable by terminal 200 for which a plurality of PRB sets are set is increased, it is also possible to reduce the probability that A/N resources of terminal 200 for which only a single PRB set is set will become an allocation block.

Conversely, when the number of A/N resources is greater than the number of terminals 200 to which the A/N resources are allocated such as when the number of terminals 200 is small or when the number of terminals 200 allocated to the downlink in the same subframe is small, it is possible to reduce the number of PRB sets used by limiting the A/N resources to be used to A to D, for example. This makes it possible to increase the number of downlink PRBs for transmitting data and thereby increase the throughput per terminal.

According to Embodiment 2, by adding a PRB set usable for the E-PDCCH terminal in accordance with the communication environment or terminal situation or the like, it is possible to gradually increase the number of A/N resource candidates as required.

According to Embodiment 1, A/N resource candidates, that is, A to D and W to Z in FIG. 16 are all A/N resources notified beforehand by RRC control information or the like. Therefore, base station 100 can easily adjust A/N resources compared to the allocation method as shown in equation 2 whereby A/N resources are determined by resources such as eCCE numbers for which the E-PDCCH is scheduled. Moreover, this allows the circuit scale of base station 100 to be reduced.

Modification Example 1

The communication system according to Embodiment 2 can achieve the same effect even if the following change is made thereto.

The number of ARI bits may be changed according to the PRB set of the E-PDCCH. For example, the number of bits of the ARI included in the E-PDCCH transmitted in PRB set A is 2 and the number of bits of the ARI included in the E-PDCCH transmitted in PRB set B is 1, or the like. Alternatively, the number of bits of the ARI may be set to 0 depending on the PRB set. At this time, one A/N resource notified as RRC control information is used.

By so doing, it is possible to obtain an effect of reducing overhead by reducing the number of ARI bits in addition to effects similar to those of Embodiment 2. For example, in an operation in which PRB set A is frequently used for E-PDCCH, and PRB set B is only used for fewer E-PDCCH terminals, fewer terminals 200 transmit E-PDCCH using PRB set B, and it is thereby possible to increase the number of ARI bits of PRB set A and reduce the number of ARI bits of PRB set B. At this time, the overhead corresponding to the ARI bits can be reduced, but since there are fewer E-PDCCH terminals of PRB set B, it is possible to reduce deterioration of the allocation block rate resulting from reducing the number of ARI bits. On the other hand, while using the same operation, in an environment in which high priority is given to a reduction of overhead of the ARI bits rather than deterioration of the allocation block rate, the number of the ARI bits of PRB set A may be conversely reduced and the number of the ARI bits of PRB set B may be increased. It is thereby possible to achieve effects similar to those of Embodiment 1 and at the same time reduce the number of ARI bits of PRB set A, reduce the number of information bits included in control information, and thereby improve receiving quality of E-PDCCH PRB set A.

Modification Example 2

The communication system of Embodiment 2 can achieve the same effect even if the following change is made thereto.

The range of A/N resource candidates specifiable by an ARI may be limited for each PRB set of the E-PDCCH.

By so doing, it is possible to obtain an effect of reducing overhead of RRC control signals by limiting the A/N resource candidate setting range in addition to effects similar to those of Embodiment 2. For example, in an operation in which PRB set A is a PRB set frequently used for E-PDCCH, and PRB set B is a PRB set only used for fewer E-PDCCH terminals, fewer terminals 200 transmit E-PDCCH using PRB set B. Thus, by widening the A/N resource candidate settable range of PRB set A and narrowing the A/N resource candidate settable range of PRB set B, it is possible to reduce the overhead of RRC while obtaining effects similar to those of Embodiment 2. On the other hand, while using the same operation, the range in which A/N resource candidates of PRB set A can be set may be narrowed and the range in which A/N resource candidates of PRB set B or C can be set may be widened. In this case, since PRB set A having a narrow setting range is used unless an allocation block occurs, it is possible to secure resources allocatable to the PUSCH and improve the uplink throughput.

[Variation]

Figure 18:
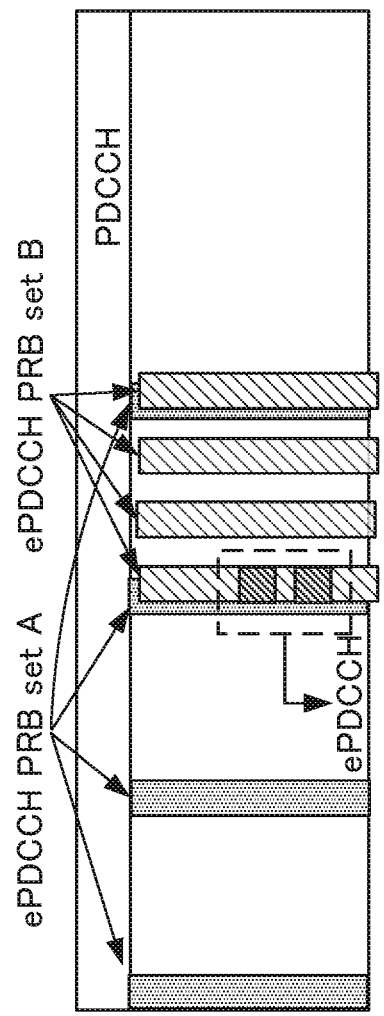
FIG. 18 is a drawing showing the subframe configuration of the downlink according to Embodiment 2.

In Embodiment 2, a certain PRB may be included in two or more different PRB sets. FIG. 18 illustrates an example. Thus, when the E-PDCCH is transmitted using a PRB included in both PRB sets, terminal 200 cannot determine which of the two A/N resources determined by the ARI and two PRB sets should be used. Since base station 100 cannot know which A/N resource is used by terminal 200 for transmission, base station 100 has to reserve both of the two A/N resources for terminal 200. This leads to deterioration of A/N resource utilization efficiency.

Thus, when the E-PDCCH is transmitted or received using PRB included in all PRB sets, Embodiment 2 can solve the above-described problem that terminal 200 cannot determine which of the two A/N resources should be used, by defining that the E-PDCCH is always regarded as having been transmitted from PRB set A. This allows terminal 200 to always determine one A/N resource to be specified by the ARI irrespective of the setting of the PRB set and it is thereby possible to prevent PUCCH resource utilization efficiency from deteriorating.

Note that in Embodiment 2, when the E-PDCCH is transmitted or received using PRBs included in all PRB sets, A/N resources corresponding to a PRB set having a smaller frequency interval of PRBs included in the PRB set may be used. The greater the spread of the frequency interval of the PRB set, the higher is the frequency diversity effect, and therefore E-PDCCH terminals of a variety of communication environments and communication qualities can receive the E-PDCCH. Therefore, an operation using mainly a PRB set having a large frequency interval may be considered. In such a case, a PRB set having a greater frequency interval is more likely to accommodate more terminals 200. Therefore, when the E-PDCCH is transmitted or received using PRBs included in all PRB sets, by using A/N resources corresponding to the PRB set having the smaller frequency interval of PRBs included in the PRB set, it is possible to reduce the probability of collision of A/N resources. Moreover, by so doing, A/N resources corresponding to the PRB set having a greater frequency interval of PRBs included in the PRB set are usable, and more terminals 200 can be accommodated.

Alternatively, in Embodiment 2, when the E-PDCCH is transmitted or received using PRBs included in all PRB sets, A/N resources corresponding to the PRB set having the greater frequency interval of PRBs included in the PRB set may be used. In an operation in which E-PDCCH terminal 200 within a cell has a relatively good communication environment and communication quality and does not require a large frequency diversity effect, using a PRB set having a smaller frequency interval allows a greater continuous band of downlink PDSCH to be obtained, and it is thereby possible to achieve high downlink throughput per terminal. Therefore, in this case, an operation of mainly using a PRB set having a smaller frequency interval may be considered. In such a case, a PRB set having a smaller frequency interval is more likely to accommodate more terminals 200. Therefore, when the E-PDCCH is transmitted or received using PRBs included in all PRB sets, by using A/N resources corresponding to the PRB set having the greater frequency interval of PRBs included in the PRB set, it is possible to reduce the possibility of collision of A/N resources. Moreover, by so doing, it is possible to use A/N resources corresponding to the PRB set having the smaller frequency interval of PRBs included in the PRB set, and thereby accommodate more terminals 200.

Embodiment 3

[Overview of Communication System]

In Embodiment 3, E-PDCCH is transmitted or received to/from a terminal by a search space (SS) composed of one or a plurality of PRBs. The terminal receives the E-PDCCH in a set search space.

One or a plurality of search spaces is/are set for each E-PDCCH terminal. A search space common to many terminals 200 is called "common search space (CSS)" and a search space common to only one or fewer terminals 200 is called "UE-specific search space (USS)." Information on the set search space is notified from base station 100 to terminal 200 through RRC control information or the like. The number of search spaces to be set can be changed from one terminal to another.

Figure 19:
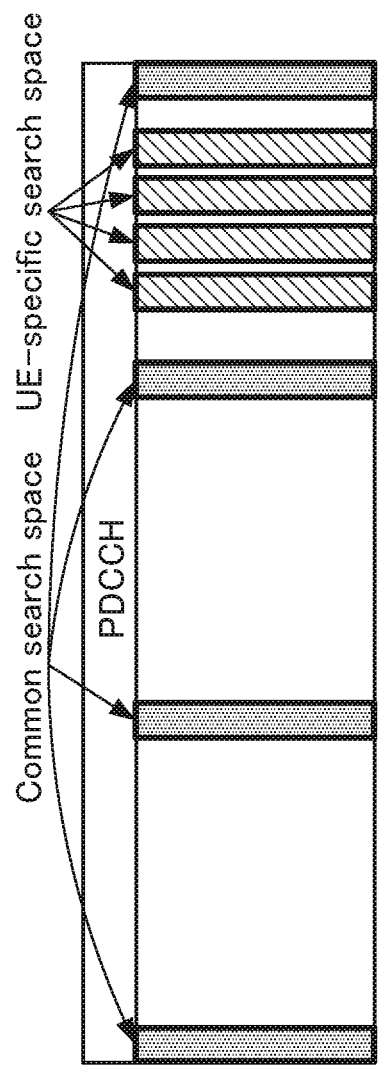
FIG. 19 is a drawing showing the subframe configuration of the downlink according to Embodiment 3.

FIG. 19 shows an example where two search spaces: CSS and USS, are set within a subframe. Since a CSS accommodates even terminal 200 having a low average received signal to interference noise power ratio (SINR) of E-PDCCH or terminal 200 unable to perform E-PDCCH frequency scheduling with high accuracy, the CSS is likely to be arranged with a large PRB interval so as to obtain a frequency diversity effect. On the other hand, a USS accommodates terminal 200 which need not be accommodated by the CSS or a terminal from which a frequency scheduling effect can be obtained, the USS is likely to be arranged with a narrow PRB interval and concentrated on a specific frequency band. A PRB for setting a search space may be settable for each terminal 200 or may be set beforehand.

To avoid having the description become complex, components similar to those in Embodiment 2 will be assigned the same reference numerals and only the difference with respect to Embodiment 2 will be described below.

[Configuration of Base Station]

The configuration of base station 100 differs from Embodiment 1 mainly in the difference in the processing done by control section 110, with other parts being the same as Embodiment 1. The details of the processing done by control section 110 will be described in detail in the description of operation to follow.

[Configuration of Terminal]

The configuration of terminal 200 differs from Embodiment 1 mainly in the difference in the processing done by control section 220, with other parts being the same as Embodiment 1. The details of the processing done by control section 220 will be described in detail in the description of operation to follow.

[Operation]

A processing flow of base station 100 and terminal 200 according to present Embodiment 3 will be described in steps (1) to (6).

FIG. 20 is a table showing ARIs included in the E-PDCCH and A/N resources determined by search spaces of the E-PDCCH when two search spaces CSS and USS are set.

Step (1): Before transmission or reception of a PDSCH, base station 100 notifies terminal 200 that can transmit control information by an E-PDCCH of the setting of a search space. Note that setting information of a CSS usable for all E-PDCCH terminals may be assumed to be defined beforehand. The setting of search spaces and the number of search spaces are determined individually for each terminal

200. For example, in FIG. 19, a CSS and USS are set for certain terminal 200 and only a CSS is set for certain terminal 200. Base station 100 notifies A/N resource candidates determined by an ARI value and search space before transmission or reception of PDSCH. These A/N resource candidates are A to D and W to Z in FIG. 20. An RRC control signal or the like is used for these notifications.

Step (2): Base station 100 determines terminal 200 to which data is assigned in each subframe and schedules it in the PDSCH. In addition to the amount of traffic to each terminal 200, CSI feedback or sounding reference signal (SRS) or the like transmitted by terminal 200 is also used for scheduling.

Step (3): Base station 100 generates control information including scheduling results for each terminal 200 and schedules the control information for the PDCCH or E-PDCCH. For terminal 200 for which a plurality of search spaces are set, base station 100 determines a search space for transmitting E-PDCCH and performs scheduling in the search space.

Base station 100 checks whether or not collision in A/N resources occurs between all scheduled terminals 200. When collision in A/N resources occurs, base station 100 changes scheduling results of the PDCCH, ARI value of the E-PDCCH and search space of the E-PDCCH or the like, and thereby confirms whether or not it is possible to avoid collision in A/N resources. When collision in A/N resources cannot be avoided, base station 100 gives up the scheduling for terminal 200 in which collision occurs (allocation block).

Step (4): When the mapping of control information by all terminals 200 is completed, base station 100 transmits, by radio, control information of the PDCCH and E-PDCCH, and downlink data of the PDSCH on the downlink by radio.

Figure 21:
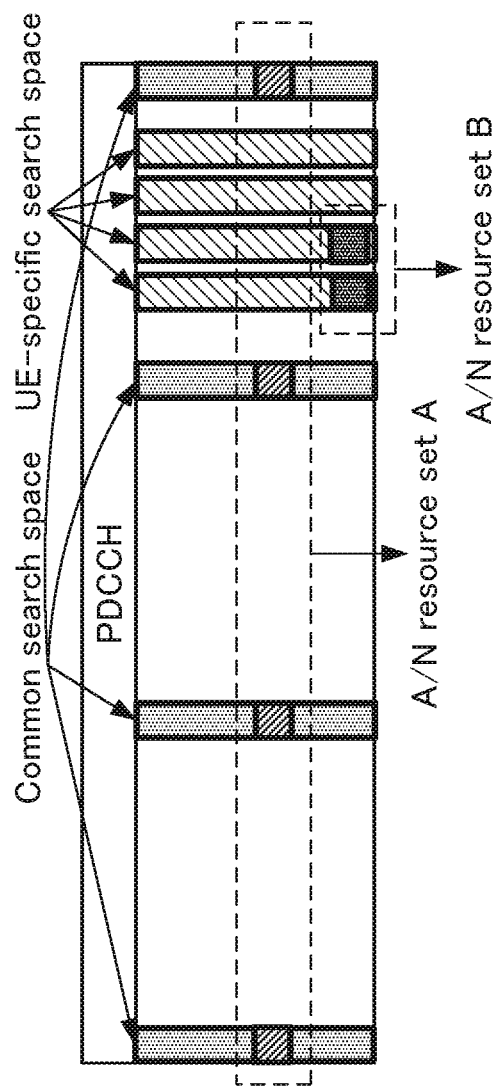
FIG. 21 is a drawing showing A/N resources identified based on a search space whereby E-PDCCH is transmitted according to Embodiment 3.

Step (5): Terminal 200 obtains control information intended for terminal 200 itself from the received signal, and extracts and decodes a data signal. Terminal 200 to which the control information might have been possibly transmitted using the E-PDCCH in particular also confirms by which search space out of one or a plurality of search spaces set beforehand and usable the control information was transmitted. Terminal 200 identifies code and frequency resources for transmitting A/N signals corresponding to the received data signal based on the control information. E-PDCCH terminal 200 in particular determines which of A/N resource candidates notified beforehand by RRC is used based on the search space whereby the E-PDCCH intended for the terminal itself is transmitted and the value of the ARI included in the E-PDCCH (e.g., see FIG. 21).

Step (6): Terminal 200 identifies ACK or NACK depending on the judgment result of the data signal and transmits an A/N signal using the above-described identified A/N resources (code and frequency resources).

[Effects]

As described above, base station 100 and terminal 200 according to Embodiment 3 can increase the number of A/N resource candidates without increasing the number of ARI bits for terminal 200 for which a plurality of E-PDCCH search spaces are set. Moreover, according to Embodiment 3, since the number of A/N resource candidates selectable by terminal 200 for which a plurality of search spaces are set is increased, it is possible to reduce the probability that A/N resources of terminal 200 for which only a single search space is set will become an allocation block.

Conversely, when the number of A/N resources is greater than the number of terminals 200 allocated such as when the number of terminals 200 is small or when the number of terminals 200 allocated on the downlink in the same subframe is small, it is possible to reduce the number of search spaces used by limiting the A/N resources used to A to D. This makes it possible to increase the number of downlink PRBs for transmitting data and thereby increase the throughput per terminal.

Furthermore, according to Embodiment 3, by additionally setting search spaces usable for the E-PDCCH terminal according to the communication environment or terminal situation or the like, it is possible to gradually increase the number of A/N resource candidates as required.

According to Embodiment 3, A/N resource candidates, that is, A to D, and W to Z in FIG. 20 are all A/N resources notified beforehand using RRC control information or the like. Therefore, base station 100 can easily adjust A/N resources compared to the allocation method as shown in equation 2 whereby A/N resources are determined by resources such as eCCE numbers for which the E-PDCCH is scheduled. Moreover, this allows the circuit scale of base station 100 to be reduced.

Modification Example 1

The communication system of Embodiment 3 can achieve the same effect even if the following changes are made thereto.

The number of ARI bits may be changed according to the search space of the E-PDCCH. For example, the number of bits of the ARI included in the E-PDCCH transmitted by CSS is 2 and the number of bits of the ARI included in the E-PDCCH transmitted by USS is 1 or the like. Alternatively, the number of bits of the ARI may be set to 0 depending on the search space. At this time, one A/N resource is always used as RRC control information.

By so doing, it is possible to reduce overhead of a CSS and improve receiving quality of the E-PDCCH transmitted by the CSS in addition to effects similar to those of Embodiment 3. Moreover, it is possible to expand the coverage of the CSS and allow terminals having various average reception SINRs to receive the E-PDCCH. Conversely, in an operation in which expansion of the coverage is unnecessary, it is possible to increase the degree of freedom of terminal 200 that transmits or receives the E-PDCCH by the CSS in selecting A/N resources by increasing the number of bits of the ARI included in the CSS and reduce the allocation block rate.

Modification Example 2

The communication system of Embodiment 3 can achieve the same effect even if the following changes are made thereto.

The range of A/N resource candidates specifiable by the ARI may be limited for each search space in which an E-PDCCH is transmitted or received.

By so doing, it is possible to obtain an effect of reducing overhead of an RRC control signal by limiting the A/N resource candidate settable range in addition to effects similar to those of Embodiment 3. For example, in such an operation in which a CSS is a search space frequently used for the E-PDCCH and a USS is a search space used for only fewer E-PDCCH terminals, fewer terminals 200 transmit the E-PDCCH using the USS. Thus, by widening the A/N resource candidate settable range of the CSS and narrowing the USS A/N resource candidate settable range, it is possible to reduce overhead of RRC while obtaining effects similar to those of Embodiment 3. On the other hand, even in the same operation, the CSS A/N resource candidate settable range may be narrowed and the USS A/N resource candidate settable range may be widened. In this case, since the CSS having a narrow setting range is used unless an allocation block occurs, it is possible to secure resources allocatable to a PUSCH and improve the uplink throughput. In such an operation in which the USS is a search space frequently used for the E-PDCCH and the CSS is a search space used for only fewer E-PDCCH terminals, many terminals 200 transmit E-PDCCHs using the USS. Thus, by widening the USS A/N resource candidate settable range and narrowing the CSS A/N resource candidate settable range, it is possible to reduce overhead of RRC while obtaining effects similar to those of Embodiment 3.

[Variation]

In Embodiment 3, there is a possibility that a certain PRB may be simultaneously included in two or more search spaces. When an E-PDCCH is transmitted by PRBs included in all search spaces, terminal 200 cannot determine which of a plurality of A/N resources determined by the ARI and search space should be used. Since base station 100 does not know which A/N resource is used by terminal 200 for transmission, base station 100 needs to reserve both of the two A/N resources for terminal 200. This deteriorates the A/N resource utilization efficiency.

Thus, when an E-PDCCH is transmitted or received by PRBs included in all search spaces, Embodiment 3 defines that the E-PDCCH should always be transmitted from CSS, and can thereby solve the problem that terminal 200 cannot determine which A/N resource should be used. This allows terminal 200 to always determine one A/N resource to be specified by the ARI irrespective of the setting of search spaces, and can thereby prevent deterioration of PUCCH resource utilization efficiency.

Note that Embodiment 3 may also be configured to use A/N resources corresponding to a USS when an E-PDCCH is transmitted or received by PRBs included in all search spaces. Since a CSS is an E-PDCCH received over a wide range, the corresponding A/N resources may also possibly have been frequently used. Thus, by defining that A/N resources corresponding to a USS are used when an E-PDCCH is transmitted or received by PRBs included in all search spaces, it is possible to allocate A/N resources which are more likely to be available and thereby reduce the probability of collision in A/N resources. Furthermore, by so doing, A/N resources of a CSS are made available and more terminal 200 can be accommodated.

Embodiment 4

[Overview of Communication System]

In Embodiment 4, an E-PDCCH is transmitted or received to/from a terminal in a distributed mode or localized mode. The distributed mode is a mode in which the E-PDCCH is arranged and transmitted over two or more PRBs, and the localized mode is a mode in which the E-PDCCH is arranged and transmitted on one PRB.

Both or one of the distributed mode and localized mode are/is set for each E-PDCCH terminal. In the distributed mode, single control information is arranged over a plurality of PRBs, and it is thereby possible to obtain a high frequency diversity effect. In the localized mode, since control information is arranged on only a single PRB, its frequency diversity effect is small but a frequency scheduling effect and interference avoidance effect can be obtained. Information on which transmission mode can be used is notified from base station 100 to terminal 200 by RRC control information or the like.

Figure 22:
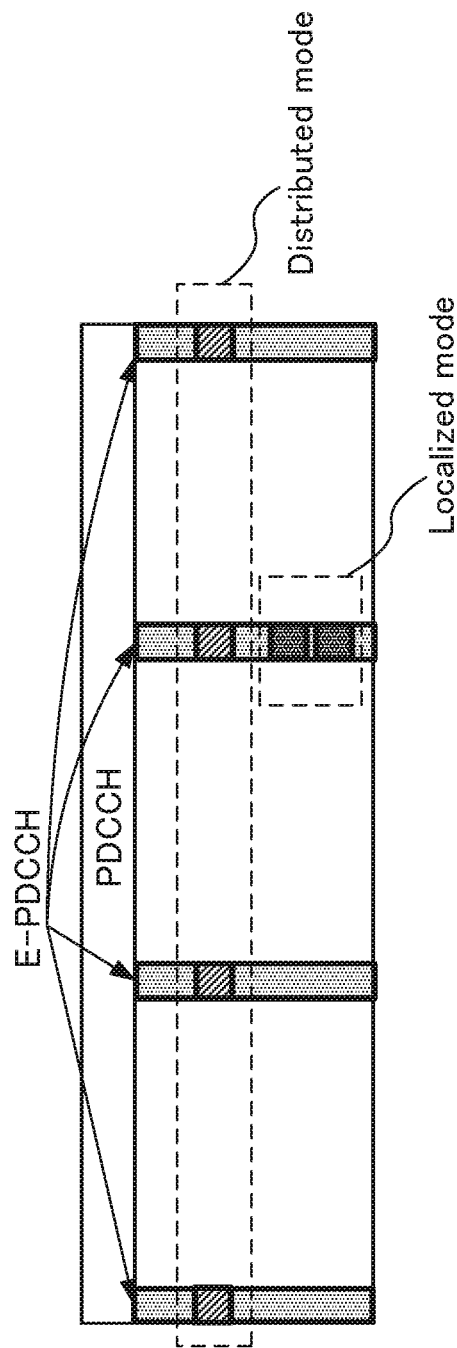
FIG. 22 is a drawing showing the subframe configuration of the downlink according to Embodiment 4.

FIG. 22 shows an example of a case where E-PDCCHs transmitted in the distributed mode and localized mode are located within a subframe. Since spread PRBs are used in the distributed mode, a frequency diversity effect can be obtained. On the other hand, in the localized mode, since control information is transmitted on a single PRB, no frequency diversity effect is obtained, but a frequency scheduling effect and interference avoidance effect can be obtained.

In the following, to avoid having the description become complex, constituent elements that are the same as in Embodiment 1 are assigned the same reference signs, and only the difference with respect to Embodiment 3 will be described.

[Configuration of Base Station]

The configuration of base station 100 differs from Embodiment 1 mainly in the difference in the processing done by control section 110, with other parts being the same as Embodiment 1. The details of the processing done by control section 110 will be described in detail in the description of operation to follow.

[Configuration of Terminal]

The configuration of terminal 200 differs mainly by the difference in the processing done by control section 220, with other parts being the same as in Embodiment 1. The details of the processing done by control section 220 will be described in detail in the description of operation to follow.

[Operation]

The processing flow of base station 100 and terminal 200 in Embodiment 4 will be described by step (1) through step (6).

FIG. 23 is a table showing A/N resources determined by an ARI included in an E-PDCCH and a search space of the E-PDCCH when two modes: distributed mode and localized mode are set.

Step (1): Before transmission or reception of a PDSCH, base station 100 notifies terminal 200 which may possibly transmit control information using an E-PDCCH of the use of the E-PDCCH. Terminal 200 to which control information is not transmitted on E-PDCCH needs no particular notification. When receiving no particular notification, terminal 200 performs reception while assuming that control information is transmitted on the PDCCH. Terminal 200 which may possibly transmit control information on the E-PDCCH is notified of the setting information of a transmission mode which may be possibly used before transmission or reception of the PDSCH. For example, both the distributed mode and localized mode are set for certain terminal 200 and only one mode, for example, the distributed mode is set for certain terminal 200. Moreover, before transmission or reception of the PDSCH, base station 100 notifies A/N resource candidates determined by the ARI value and the transmission mode in which the E-PDCCH is transmitted or received. These A/N resource candidates are A to D, and W to Z in FIG. 23. These are notified using an RRC control signal or the like.

Step (2): Base station 100 determines terminal 200 to which data is assigned in each subframe and schedules it in the PDSCH. In addition to the amount of traffic to each terminal 200, CSI feedback or a sounding reference signal (SRS) or the like transmitted by terminal 200 is also used for scheduling.

Step (3): Base station 100 generates control information including scheduling results for each terminal 200 and schedules the PDCCH or E-PDCCH. For terminal 200 for which a plurality of search spaces are set on the E-PDCCH, base station 100 also determines a transmission mode used for transmission.

Base station 100 confirms whether or not collision in A/N resources occurs between all scheduled terminals 200. When collision in A/N resources occurs, base station 100 changes scheduling results of the PDCCH, ARI value of the E-PDCCH and the transmission mode of the E-PDCCH or the like, and thereby confirms whether or not it is possible to avoid collision in A/N resources. When collision in A/N resources cannot be avoided, base station 100 gives up the scheduling for terminal 200 (allocation block).

Step (4): When the scheduling of control information by all terminals 200 is completed, base station 100 transmits, by radio, control information of the PDCCH and E-PDCCH, and downlink data of the PDSCH on the downlink.

Figure 24:
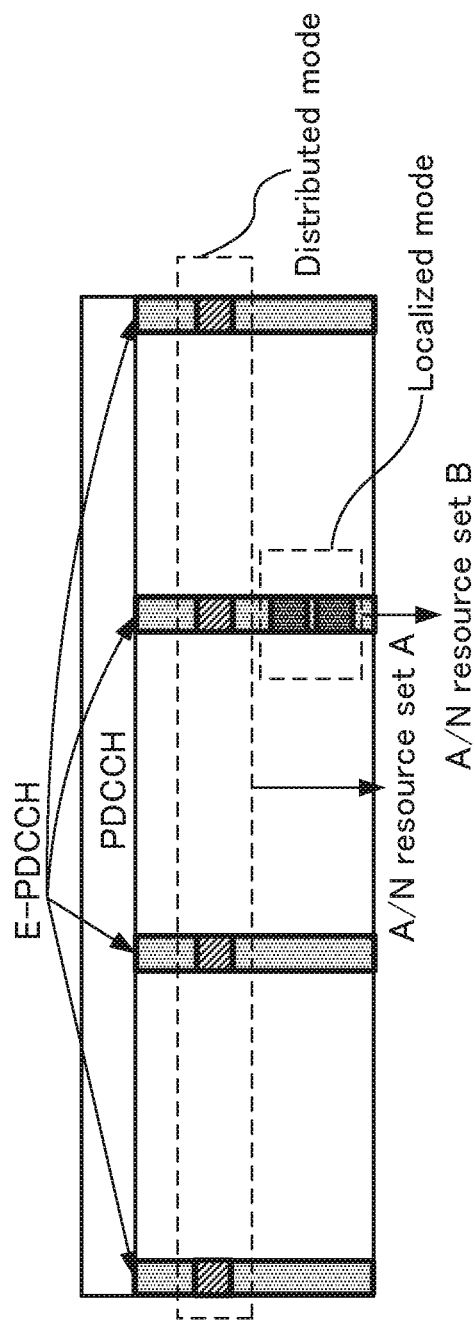
FIG. 24 is a drawing showing A/N resources identified based on a transmission mode used for transmission of an E-PDCCH according to Embodiment 4.

Step (5): Terminal 200 obtains control information intended for terminal 200 itself from the received signal and extracts and decodes the data signal. Terminal 200 to which the control information might have been possibly transmitted on the E-PDCCH in particular confirms in which transmission mode out of one or a plurality of usable transmission modes the control information was transmitted. Terminal 200 identifies code and frequency resources for transmitting A/N signals corresponding to the received data signal based on the control information. E-PDCCH terminal 200 in particular determines which of A/N resource candidates notified beforehand using RRC is used based on the transmission mode in which the E-PDCCH intended for terminal 200 itself is transmitted and the value of the ARI included in the E-PDCCH (e.g., see FIG. 24).

Step (6): Terminal 200 identifies either ACK or NACK in accordance with the judgment results of the data signal, and transmits the A/N signal using the A/N resources (code and frequency resources) identified as noted above.

[Effects]

As described above, base station 100 and terminal 200 according to Embodiment 4 can increase the number of A/N resource candidates for terminal 200 for which a plurality of E-PDCCH transmission modes are set without increasing the number of ARI bits. Furthermore, according to Embodiment 4, since the number of A/N resource candidates selectable by terminal 200 for which a plurality of transmission modes are set is increased, it is also possible to reduce the probability that A/N resources of terminal 200 for which only a single transmission mode, for example distributed mode, is set will become an allocation block.

Conversely, when the number of A/N resources is greater than the number of terminals 200 to which the A/N resources are allocated such as when the number of terminals 200 is small or when the number of terminals 200 allocated on the downlink in the same subframe is small, it is possible to limit the transmission mode used by limiting the A/N resources to be used to A to D, for example. For example, by limiting the transmission mode to a distributed mode, E-PDCCHs of all terminals 200 can obtain a frequency diversity effect, and it is thereby possible to achieve high quality E-PDCCH reception. Conversely, by limiting the transmission mode to a localized mode, E-PDCCHs of all terminals 200 are transmitted in a single PRB, and it is thereby possible to reduce the total number of PRBs used for the E-PDCCH. It is thereby possible to increase the number of PRBs usable for the PDSCH and improve the downlink throughput per terminal.

According to Embodiment 4, by additionally setting a transmission mode usable for the E-PDCCH terminal in accordance with the communication environment or terminal situation or the like, it is possible to gradually increase the number of A/N resource candidates as required.

According to Embodiment 4, A/N resource candidates, that is, A to D and W to Z in FIG. 23 are all A/N resources notified beforehand by RRC control information or the like. Therefore, base station 100 can easily adjust A/N resources compared to the allocation method as shown in equation 2 whereby A/N resources are determined by resources such as eCCE numbers for which the E-PDCCH is scheduled. Moreover, this allows the circuit scale of base station 100 to be reduced.

[Variation]

In Embodiment 4, when a control signal transmitted on the E-PDCCH uses only one unit resource such as eCCE, that is, when an aggregation level is 1, the A/N resource may be determined assuming that the control signal is transmitted in the localized mode. In the distributed mode having a high frequency diversity effect and allowing more terminals 200 to perform reception, more terminals are likely to be accommodated. Therefore, when the aggregation level is 1, it is possible to determine A/N assuming that the control signal is transmitted in the localized mode, and thereby reduce the allocation block probability of the A/N resources.

Modification Example 1

The communication system of Embodiment 4 can achieve the same effect even if the following changes are made thereto.

The number of bits of an ARI may be changed depending on the transmission mode of an E-PDCCH. For example, the number of bits of the ARI included in the E-PDCCH transmitted in the distributed mode is 2 and the number of bits of the ARI included in the E-PDCCH transmitted in the localized mode is 1 or the like. Alternatively, the ARI may also be set to have 0 bits depending on the transmission mode. When the ARI has 0 bits, one A/N resource given as RRC control information is always used.

By so doing, it is possible to obtain an effect of reducing overhead by reducing the number of ARI bits in addition to effects similar to those of Embodiment 4. In an operation in which the E-PDCCH is transmitted to more terminals in the distributed mode, by adopting more ARI bits included in the E-PDCCH in the distributed mode than in the localized mode, it is possible to reduce the allocation block rate while suppressing the influence of the reduction in the number of ARI bits. On the contrary, in an operation in which the E-PDCCH is actively transmitted in the localized mode, by adopting more ARI bits included in the E-PDCCH in the localized mode than in the distributed mode, it is possible to reduce the allocation block rate while suppressing the influence of the reduction in the number of ARI bits.

Modification Example 2

The communication system of Embodiment 4 can achieve the same effect even if the following changes are made thereto.

The range of A/N resource candidates specifiable by the ARI may be limited for each transmission mode in which the E-PDCCH is transmitted or received.

By so doing, it is possible to obtain an effect of reducing overhead of RRC control signals by limiting the A/N resource candidate settable range in addition to effects similar to those of Embodiment 4. For example, in an operation in which the distributed mode is frequently used for the E-PDCCH and the localized mode is used only for fewer E-PDCCH terminals, fewer terminals 200 receive the E-PDCCH in the localized mode. Thus, by widening the A/N resource candidate settable range in the distributed mode and narrowing the A/N resource candidate settable range in the localized mode, it is possible to reduce the overhead of RRC while obtaining effects similar to those of Embodiment 4.

Embodiment 5

In Embodiment 5, the E-PDCCH is transmitted or received by one of one or a plurality of component carriers (CC) set for a terminal. Here, it is assumed that one or a plurality of CCs used for transmission of the E-PDCCH is/are set for terminal 200 that receives the E-PDCCH. Before transmission of a PDSCH, base station 100 notifies terminal 200 of A/N resources determined by the ARI value and CC whereby the E-PDCCH is transmitted.

Figure 25:
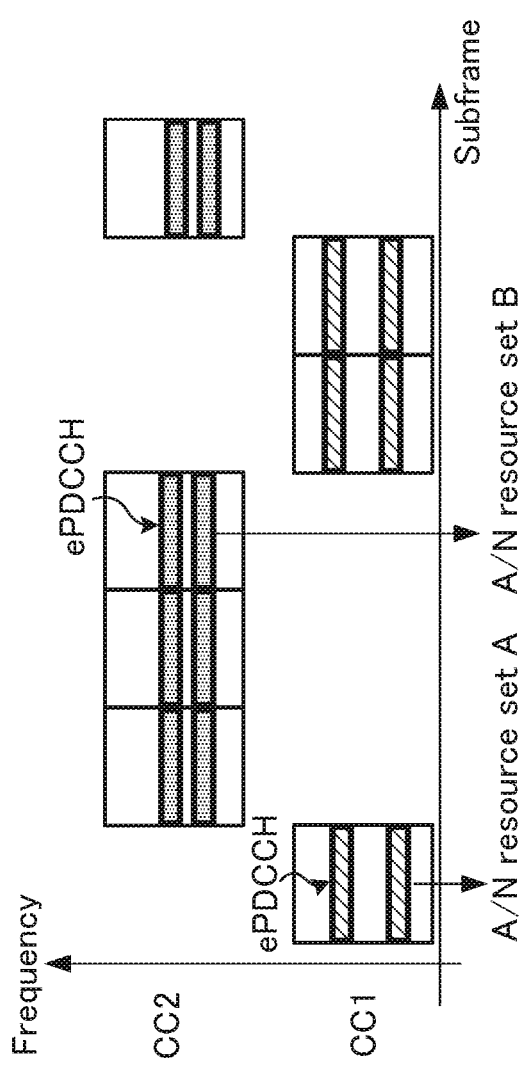
FIG. 25 is a drawing showing the subframe configuration of the downlink according to Embodiment 5.

In Embodiment 5, base station 100 determines A/N resources to be used by E-PDCCH terminal 200 by the value of an ARI included in an E-PDCCH and CC whereby the E-PDCCH is transmitted. As in the cases of Embodiments 1 to 4, terminal 200 selects A/N resources to be used from among A/N resource candidates notified beforehand based on the value of the ARI included in the received E-PDCCH and from which CC the E-PDCCH is detected. For example, as shown in FIG. 25, two CCs are set to transmit/receive the E-PDCCH and when the E-PDCCH is transmitted from CC1 or CC2, terminal 200 determines A/N resources to be used based on the value of the ARI and from which of CC1 or CC2, the E-PDCCH is transmitted.

As described above, base station 100 and terminal 200 according to Embodiment 5 can increase the number of A/N resource candidates for terminal 200 for which a plurality of CCs are set without increasing the number of bits of the ARI. Furthermore, according to Embodiment 5, since the number of A/N resource candidates selectable by terminal 200 for which the plurality of CCs are set is increased, it is possible to reduce the probability that A/N resources of terminal 200 for which only a single CC is set will become an allocation block.

According to Embodiment 5, all A/N resources selectable by the ARI and CC are resources notified beforehand by RRC control information or the like. Therefore, base station 100 can easily adjust A/N resources compared to the allocation method as shown in equation 2 whereby A/N resources are determined by resources such as eCCE number for which the E-PDCCH is scheduled. This allows the circuit scale of base station 100 to be reduced.

Embodiment 6

Figure 26:
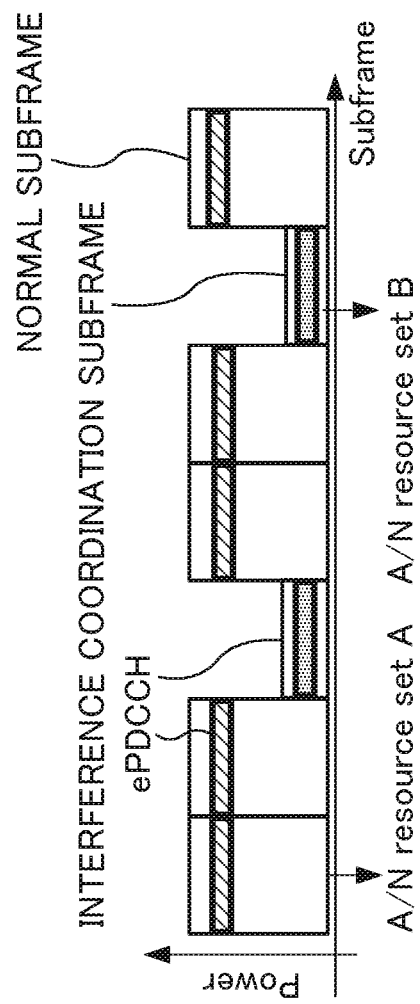
FIG. 26 is a drawing showing the subframe configuration of the downlink according to Embodiment 6.

In Embodiment 6, E-PDCCHs are transmitted in one of an interference coordination subframe and normal subframe. FIG. 26 illustrates an example of transmitting or receiving both an interference coordination subframe and a normal subframe. In the interference coordination subframe, some or all base stations 100 perform transmission with small power. Base station 100 notifies beforehand some or all terminals 200 of a time relationship between the interference coordination subframe and the normal subframe using RRC control information or the like.

In Embodiment 6, A/N resources used by E-PDCCH terminal 200 are determined based on the value of the ARI included in the E-PDCCH and whether the E-PDCCH is transmitted in the interference coordination subframe or the normal subframe. Before transmission of a PDSCH, base station 100 notifies beforehand terminal 200 of A/N resources determined based on the value of the ARI and the type of subframe in which the E-PDCCH is transmitted. As in the cases of Embodiments 1 to 4, terminal 200 selects A/N resources to be used from among A/N resource candidates notified beforehand based on the value of the ARI included in the received E-PDCCH and in which subframe the E-PDCCH is received.

As described above, base station 100 and terminal 200 according to Embodiment 6 can increase the number of A/N resource candidates without increasing the number of bits of the ARI for terminal 200 to which information on the interference coordination subframe is notified. According to Embodiment 6, since the number of A/N resource candidates selectable by terminal 200 for which an interference coordination subframe is set is increased, it is possible to reduce the probability that A/N resources of terminal 200 for which only normal subframe is set may become an allocation block.

According to Embodiment 6, all A/N resources selectable based on the ARI and the type of subframe are resources notified beforehand by RRC control information or the like. Therefore, base station 100 can easily adjust A/N resources compared to the allocation method as shown in equation 2 whereby A/N resources are determined by resources such as eCCE number for which the E-PDCCH is scheduled. This allows the circuit scale of base station 100 to be reduced.

[Variation 1]

A case has been described in Embodiment 6 where, interference coordination is performed in subframe units, but even when interference coordination is performed in PRB units, similar effects can be achieved using Embodiment 6. In this case, terminal 200 determines A/N resources based on whether the E-PDCCH is an interference coordination PRB or normal PRB, and the ARI value.

In this case, in addition to the effects of Embodiment 6, whether or not interference coordination is performed is set in PRB units, and it is thereby possible to change A/N resources to be used according to the PRB even in the same subframe.

[Variation 2]

Figure 27:
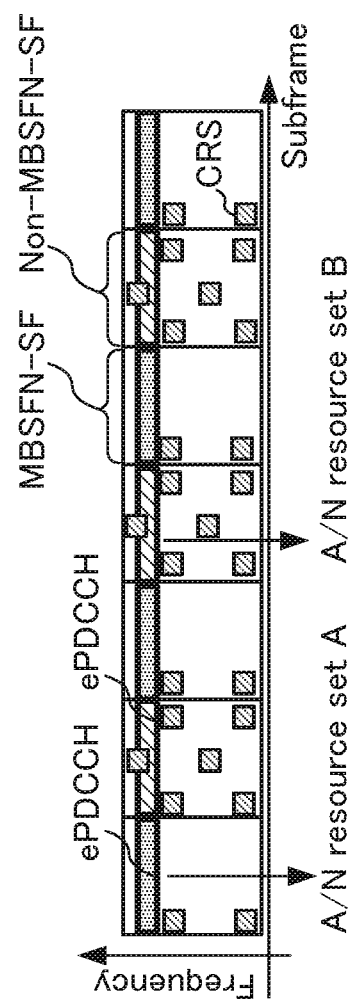
FIG. 27 is a drawing showing the other subframe configuration of the downlink according to Embodiment 6.

A case has been described in Embodiment 6 whether a subframe is an interference coordination subframe or normal subframe is used to determine A/N resources. However, the same effect as that of Embodiment 6 can be obtained even when whether a subframe in which the E-PDCCH is transmitted or received is a broadcast type (MBSFN) subframe or a normal subframe is used to determine A/N resources. Whether a subframe is an MBSFN subframe or not is determined depending on whether a cell-specific reference signal (CRS) is only in a PDCCH time domain or not (e.g., see FIG. 27). Information on which subframe is an MBSFN subframe is notified beforehand from base station 100 to terminal 200. As in the case of variation 1, MBSFN may be a PRB unit instead of subframe unit. If MBSFN is a PRB unit, the number of A/N resource candidates can be increased without increasing the number of bits of the ARI in all subframes.

[Variation 3]

Figure 28:
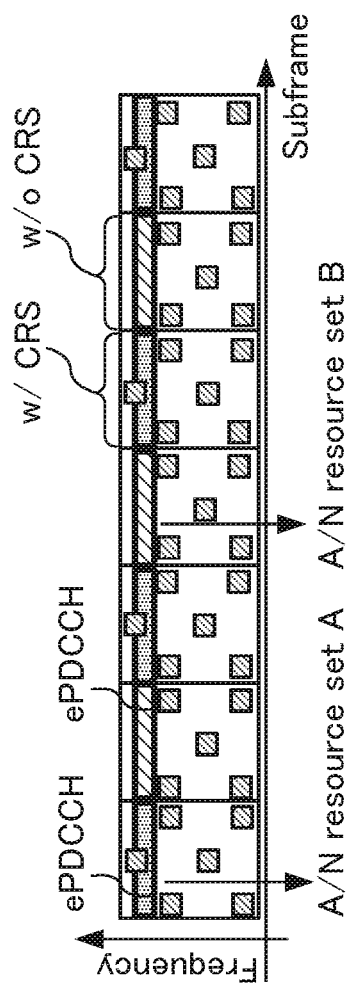
FIG. 28 is a drawing showing the other subframe configuration of the downlink according to Embodiment 6.

Alternatively, the same effect as that in Embodiment 6 can be obtained even when whether a subframe in which the E-PDCCH is transmitted or received is a subframe including CRS (w/CRS) or a subframe not including CRS (w/o CRS) is used to determine A/N resources (e.g., see FIG. 28). As in the cases of variations 1 and 2, whether or not CRS is included may be a PRB unit instead of a subframe unit. In the case of a PRB unit, it is possible to increase the number of A/N resource candidates without increasing the number of bits of the ARI in all subframes.

[Variation 4]

Alternatively, the same effect as that in Embodiment 6 can be obtained even when whether a subframe in which the E-PDCCH is transmitted or received is a subframe assigned semi-static downlink transmission or a subframe assigned downlink transmission by DCI is used to determine A/N resources. As in the cases of variations 1, 2 and 3, whether semi-static assignment is applied or not may be determined in PRB units instead of subframe units. In the case of the PRB units, it is possible to increase the number of A/N resource candidates without increasing the number of bits of the ARI in all subframes.

Note that Embodiments 2 to 6 described so far may be used in combination in plurality instead of using the respective embodiments separately. Combining the embodiments makes it possible to further increase the degree of freedom in selecting A/N resources without increasing the number of bits of the ARI.

Embodiment 7

[Overview of Communication System]

Figure 29:
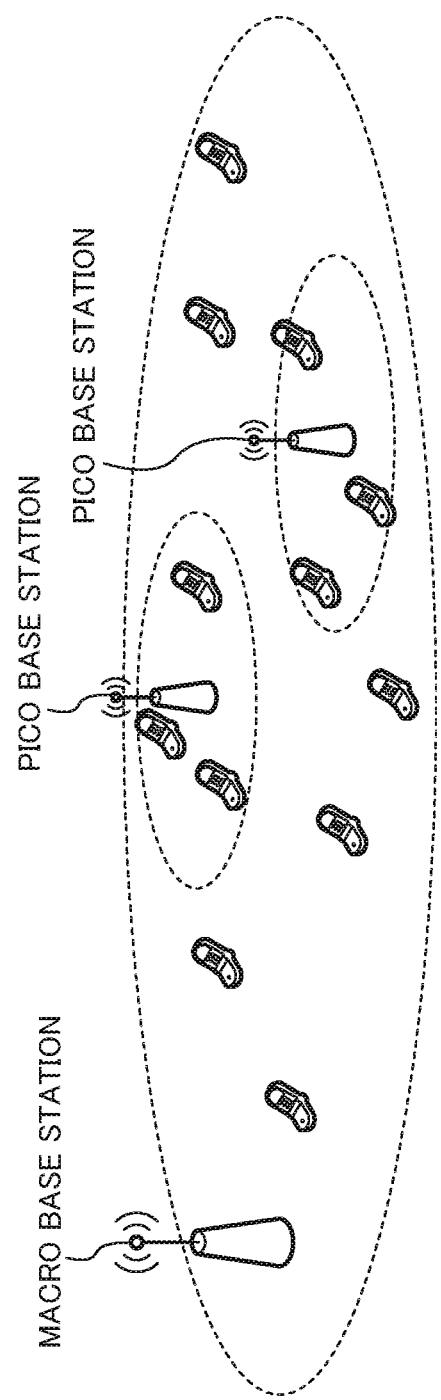
FIG. 29 is a drawing showing a communication system in Embodiment 7.

A communication system according to Embodiment 7 is constructed of one or a plurality of nodes (macro base station, pico base station), and a plurality of terminals as shown in FIG. 29. A plurality of pico nodes are arranged in a cell of a macro base station forming a large cell (hereinafter, a macro base station in a CoMP scenario 4 is described as "macro node" and a pico base station is described as "pico node"). The base station can perform coordinated transmission on the downlink and coordinated reception on the uplink using the plurality of nodes.

A pico base station may be one such as an RRH (remote radio head). The macro base station and the pico base stations are connected by a low-delay, high-capacity interface such as an optical fiber, and constitute a CoMP set. In the following, to avoid having the description become complex, constituent elements that are the same as in Embodiment 1 are assigned the same reference signs, and only the difference with respect to Embodiment 1 will be described.

[Configuration of Base Station]

The configuration of base station (macro base station, pico base stations) 100 differs from Embodiment 1 mainly in the difference in the processing done by control section 110, with other parts being the same as Embodiment 1. However, a plurality of base stations 100 are disposed within a macrocell, and as described above, these base stations are connected by a low-delay, high-capacity interface and form a CoMP set. The details of the processing done by control section 110 will be described in detail in the description of operation to follow.

[Configuration of Terminal]

The configuration of terminal 200 differs mainly by the difference in the processing done by control section 220, with other parts being the same as in Embodiment 1. The details of the processing done by control section 220 will be described in detail in the description of operation to follow.

[Operation]

The processing flow of base station 100 and terminal 200 in Embodiment 7 will be described by step (1) through step (6).

Step (1): Before transmission or reception of a PDSCH, base station 100 notifies certain terminal 200 which may possibly transmit control information on an E-PDCCH of the use of the E-PDCCH. Terminal 200 to which control information is not transmitted on E-PDCCH needs no particular notification. When receiving no particular notification or being unable to recognize, terminal 200 receives control information while assuming that the control information is transmitted on the PDCCH. Before transmission or reception of a PDSCH, base station 100 notifies terminal 200 which may possibly transmit control information on an E-PDCCH of the configuration of the E-PDCCH which may be possibly used as RRC control information. Furthermore, before transmission or reception of the PDSCH, base station 100 notifies terminal 200 of A/N resource candidates determined by the ARI value and the configuration of the E-PDCCH as RRC control information. These A/N resource candidates are A to D, and W to Z in FIG. 30. Moreover, base station 100 notifies terminal 200 of a virtual cell ID corresponding to each A/N resource as RRC control information. Here, the virtual cell ID refers to a base sequence number necessary to transmit a PUCCH, a sequence hopping pattern or an ID necessary to determine a cyclic shift (CS) hopping pattern. In a conventional system in Rel.10, this ID is a cell ID and a parameter common among all terminals 200 in a cell, but in present Embodiment 7, the virtual cell ID is assumed to be a parameter individually settable for terminal 200.

Step (2): Base station 100 determines terminal 200 to which data is assigned in each subframe and schedules it in the PDSCH. In addition to the amount of traffic to each terminal 200, CSI feedback or sounding reference signal (SRS) or the like transmitted by terminal 200 is also used for scheduling.

Step (3): Base station 100 generates control information including scheduling results for each terminal 200 and schedules the PDCCH and E-PDCCH. Base station 100 also determines the configuration used for E-PDCCH transmission for terminal 200 in which a plurality of E-PDCCH configurations are set.

Base station 100 confirms whether or not collision in A/N resources occurs between all scheduled terminals 200. When collision in A/N resources occurs, base station 100 changes the scheduling results of the PDCCH, ARI value of the E-PDCCH and the configuration of the E-PDCCH or the like, and thereby confirms whether or not it is possible to avoid collision in A/N resources. When collision in A/N resources cannot be avoided, base station 100 gives up the scheduling for terminal 200 (allocation block).

Step (4): When the mapping of control information by all terminals 200 is completed, base station 100 transmits, by radio, control information of the PDCCH and E-PDCCH, and downlink data of the PDSCH on the downlink.

Step (5): Terminal 200 obtains control information intended for terminal 200 itself from the received signal and extracts and decodes the data signal. Terminal 200 to which the control information might have been possibly transmitted on the E-PDCCH in particular also confirms in which configuration out of one or a plurality of usable configurations the control information was transmitted. Terminal 200 identifies code and frequency resources for transmitting A/N signals corresponding to the received data signal based on the control information. E-PDCCH terminal 200 in particular determines which of A/N resource candidates notified beforehand using RRC is used based on the configuration of the E-PDCCH intended for terminal 200 itself and the value of the ARI included in the E-PDCCH. Terminal 200 also determines a virtual cell ID corresponding to the A/N resource. FIG. 30 illustrates an example of A/N resources and corresponding virtual cell IDs determined by the E-PD- CCH configuration and the ARI. In FIG. 30, although VCID-0 and VCID-1 are set as virtual cell IDs, different virtual cell IDs may also be set for all A/N resources.

Step (6): Terminal 200 identifies either ACK or NACK in accordance with the judgment results of the data signal, and transmits the A/N signal using the A/N resources (code and frequency resources) identified as noted above. A/N signals are transmitted by the PUCCH. Terminal 200 generates a base sequence number, base sequence hopping pattern, and CS hopping pattern of the PUCCH using virtual cell IDs corresponding to the above-described A/N resources.

[Effects]

In addition to the effects of Embodiment 1, Embodiment 7 can generate a PUCCH with different virtual cell IDs according to the configuration of the E-PDCCH. A/N resources of the PUCCH can be orthogonalized only between terminals 200 having an identical virtual cell ID or cell ID. Therefore, according to Embodiment 7, it is possible to transmit A/N signals that can be multiplexed with a terminal 200 group which differs from one E-PDCCH configuration to another. This allows, for example, terminal 200 located between a macro base station and a pico base station to generate A/N signals that are received at the macro base station and can be multiplexed with signals from a macro terminal, and A/N signals that are received at the pico base station and can be multiplexed with signals from a pico terminal according to the E-PDCCH configuration.

When the E-PDCCH configuration supports different transmission base stations, Embodiment 7 allows the ID to be switched to a virtual cell ID used to receive A/N signals at an E-PDCCH transmitting station. Since an A/N signal is a signal used for retransmission control, receiving an A/N signal at the E-PDCCH transmitting base station makes it possible to perform retransmission control with reduced delay or backhaul burden.

Not only a virtual cell ID but also parameters such as transmission power or timing offset may be set so as to be dynamically switched according to the E-PDCCH configuration. In this way, even when the distance from terminal 200 to the macro base station is considerably different from the distance from terminal 200 to the pico base station, it is possible to receive A/N signals by switching between A/N signal receiving stations.

In Embodiment 7, the number of virtual cell IDs is assumed to be 2, but one ID may be a cell-specific ID (cell ID). This is because one of the E-PDCCH transmitting base stations is very likely to be a cell connected to the terminal on the downlink. Employing a known cell ID for one of the virtual cell IDs makes it possible to reduce overhead of an RRC control signal while achieving effects comparable to those of Embodiment 7.

The embodiments of the present invention have been described thus far.

In the embodiments described above, the present invention is described using an example of a case where the present invention is implemented as hardware. However, the present invention can be achieved by software in concert with hardware.

The functional blocks described in the embodiments described above are achieved by an LSI, which is typically an integrated circuit. The functional blocks may be provided as individual chips, or part or all of the functional blocks may be provided as a single chip. Depending on the level of integration, the LSI may be referred to as an IC, a system LSI, a super LSI, or an ultra LSI.

In addition, the circuit integration is not limited to LSI and may be achieved by dedicated circuitry or a general-purpose processor other than an LSI. After fabrication of LSI, a field programmable gate array (FPGA), which is programmable, or a reconfigurable processor which allows reconfiguration of connections and settings of circuit cells in LSI may be used.

Should a circuit integration technology replacing LSI appear as a result of advancements in semiconductor technology or other technologies derived from the technology, the functional blocks could be integrated using such a technology. Another possibility is the application of biotechnology and/or the like.

A radio communication terminal according to the above-described embodiment adopts a configuration including a receiving section that receives a control signal including an ACK/NACK index via an enhanced physical downlink control channel (E-PDCCH) transmitted using one configuration from among one or a plurality of configuration candidates, a control section that selects a resource to be used for an ACK/NACK signal of downlink data from among specified resources specified beforehand based on E-PDCCH configuration information used for transmission or reception of the E-PDCCH and the ACK/NACK index, and a transmitting section that transmits the ACK/NACK signal using the selected specified resource.

This configuration allows the number of A/N resource candidates to increase for terminal 200 for which a plurality of E-PDCCH configurations are set beforehand without increasing the number of bits of the ARI. This makes it possible to reduce the probability of allocation block also for terminal 200 for which only a single E-PDCCH configuration is set. By adding a configuration usable for an E-PDCCH terminal in accordance with a communication environment or terminal situation or the like, it is possible to gradually increase the number of A/N resource candidates as required.

In the radio communication terminal according to the above-described embodiment, the ACK/NACK index indicates a number of states that differs depending on the configuration of the E-PDCCH transmitted and the control section selects a resource to be used for an ACK/NACK signal of downlink data from among the specified resources specified beforehand based on the configuration information used for transmission or reception of the E-PDCCH and the ACK/NACK index.

This makes it possible to reduce the number of bits required to select ACK/NACK resources according to an ACK/NACK index and reduce overhead.

In the radio communication terminal according to the above-described embodiment, the specified resources are to be specified within a range that differs depending on the configuration used for transmission or reception of the E-PDCCH and the control section selects a resource to be used for an ACK/NACK signal of downlink data from among the specified resources specified beforehand, based on the configuration information used for transmission or reception of the E-PDCCH and the ACK/NACK index.

Thus, by limiting the range in which resources can be used as ACK/NACK resources, it is possible to narrow the range of values that can be taken by the ACK/NACK resources and reduce overhead required to notify the specified resources.

In the radio communication terminal according to the above-described embodiment, the configuration candidates are each a frequency resource block (PRB) set.

Thus, it is possible to increase the number of specified resources for terminal 200 for which a plurality of E-PDCCH PRB sets are set beforehand without increasing the number of states of the ACK/NACK index. Moreover, by adding PRB sets that can be used for an E-PDCCH terminal in accordance with the communication environment or terminal situation or the like, it is possible to gradually increase the number of A/N resource candidates as required. Furthermore, since all the increased specified resources are ACK/NACK resources notified beforehand from the base station, it is easy for the base station to adjust ACK/NACK resources between terminals and the base station can be operated with a small circuit scale or algorithm.

In the radio communication terminal according to the above-described embodiment, when PRBs in which the control signal including the ACK/NACK index is transmitted or received are PRBs belonging to two or more PRB sets, the control section assumes that the PRBs belong to a predetermined specific PRB set and selects an ACK/NACK resource from among the specified resources specified beforehand using the specific PRB set and the ACK/NACK index.

Even when it is not possible to distinguish a PRB set of PRBs through which a control signal including an ACK/NACK index is transmitted or received, ACK/NACK resources can be uniquely determined, and the base station thereby no longer needs to reserve ACK/NACK resources corresponding to a plurality of PRB sets and ACK/NACK resource utilization efficiency improves.

In the radio communication terminal according to the above-described embodiment, when PRBs in which the control signal including the ACK/NACK index is transmitted or received are PRBs belonging to two or more PRB sets, the control section assumes that the PRBs belong to a specific PRB set in which an interval between a PRB having a lowest frequency and a PRB having a highest frequency is small, and selects an ACK/NACK resource from among the specified resources specified beforehand using the specific PRB set and the ACK/NACK index.

Since ACK/NACK resources are determined assuming that the PRBs belong to a PRB set having a small number of terminals, the ACK/NACK is less likely to be used by other terminals and it is possible to reduce the probability of ACK/NACK resources becoming an allocation block.

In the radio communication terminal according to the above-described embodiment, the configuration candidates are each a search space.

Thus, it is possible to increase the number of specified resources for terminal 200 for which a plurality of search spaces are set beforehand without increasing the number of states of the ACK/NACK index. Moreover, by adding a search space that can be used for an E-PDCCH terminal in accordance with the communication environment or terminal situation or the like, it is possible to gradually increase the number of A/N resource candidates as required. Furthermore, since all the increased specified resources are ACK/NACK resources notified beforehand from the base station, it is easy for the base station to adjust ACK/NACK resources between terminals and the base station can be operated with a small circuit scale or algorithm.

In the radio communication terminal according to the above-described embodiment, when PRBs in which the control signal including the ACK/NACK index is transmitted or received are PRBs belonging to two or more search spaces, the control section assumes that the PRBs belong to a terminal-specific search space (USS) and selects an ACK/NACK resource from among the specified resources specified beforehand using the USS and the ACK/NACK index.

Even when it is not possible to distinguish a search space through which a control signal including an ACK/NACK index is transmitted or received, ACK/NACK resources can be uniquely determined, and the base station thereby no longer needs to reserve ACK/NACK resources corresponding to a plurality of search spaces and ACK/NACK resource utilization efficiency improves. Moreover, using ACK/NACK resources corresponding to a USS which is likely to have fewer simultaneously accommodated terminals makes it possible to reduce the probability of the ACK/NACK resources becoming an allocation block.

In the radio communication terminal according to the above-described embodiment, the configuration candidates are each a transmission mode used for transmission of an E-PDCCH and the transmission mode is a distributed mode in which the E-PDCCH is transmitted using two or more PRBs or a localized mode in which the E-PDCCH is transmitted using only one PRB.

It is thereby possible to increase the number of specified resources without increasing the number of states of the ACK/NACK index for terminal 200 for which both a distributed mode and a localized mode are set beforehand. Moreover, by adding a transmission mode usable for an E-PDCCH terminal in accordance with the communication environment or terminal situation or the like, it is possible to gradually increase the number of A/N resource candidates as required. Furthermore, since all the increased specified resources are ACK/NACK resources notified beforehand from the base station, it is easy for the base station to adjust ACK/NACK resources between terminals and the base station can be operated with a small circuit scale or algorithm.

In the radio communication terminal according to the above-described embodiment, the configuration candidates are each a component carrier (CC).

It is thereby possible to increase the number of specified resources without increasing the number of states of the ACK/NACK index for terminal 200 for which the use of a plurality of CCs is set beforehand. Moreover by adding CCs usable for an E-PDCCH terminal in accordance with the communication environment or terminal situation or the like, it is possible to gradually increase the number of A/N resource candidates as required. Furthermore, since all the increased specified resources are ACK/NACK resources notified beforehand from the base station, it is easy for the base station to adjust ACK/NACK resources between terminals and the base station can be operated with a small circuit scale or algorithm.

In the radio communication terminal according to the above-described embodiment, the control section selects a resource to be used for an ACK/NACK signal of downlink data, a base sequence of a PUCCH for transmitting the ACK/NACK signal, and a virtual cell ID to be used to generate a hopping pattern or cyclic shift (CS) hopping pattern from among the specified resources specified and specified virtual cell IDs beforehand, based on the configuration information of the E-PDCCH used for transmission or reception of the E-PDCCH and the ACK/NACK index, and the transmitting section transmits the ACK/NACK signal using the selected specified resource and specified virtual cell ID.

It is thereby possible to increase the number of A/N resource candidates without increasing the number of bits of the ARI for terminal 200 for which a plurality of E-PDCCH configurations are set beforehand. Furthermore, by changing the format of ACK/NACK signals to be transmitted in accordance with the configuration and the state of the ACK/NACK index, it is possible to multiplex a plurality of different terminal groups with the ACK/NACK signals and transmit the multiplexed signal.

A base station apparatus according to the above-described embodiment adopts a configuration including a control section that determines a resource for transmitting an ACK/NACK signal in response to downlink data from a radio communication terminal from among specified resources specified beforehand, based on a configuration used for transmission of an E-PDCCH out of one or a plurality of E-PDCCH configurations indicated beforehand to the radio communication terminal and an ACK/NACK index included in a control signal and a transmitting section that transmits the control signal including the ACK/NACK index indicating the determination result of the control section via the E-PDCCH using the configuration corresponding to the determined specified resource.

This makes it possible to switch between specified resources of an E-PDCCH terminal specifiable by the ACK/NACK index according to the configuration of the E-PDCCH transmitted. It is thereby possible to increase the number of alternatives in selecting ACK/NACK without increasing the number of states of the ACK/NACK index.

In the base station apparatus according to the above-described embodiment, the configurations are each a frequency resource block (PRB) set.

Thus, specified resources of an E-PDCCH terminal specifiable by the ACK/NACK index can be switched by a PRB set of the E-PDCCH transmitted. It is thereby possible to increase the number of alternatives in selecting ACK/NACK without increasing the number of states of the ACK/NACK index.

In the base station apparatus according to the above-described embodiment, the configurations are each a search space.

Thus, specified resources of an E-PDCCH terminal specifiable by the ACK/NACK index can be switched by a search space of the E-PDCCH transmitted. It is thereby possible to increase the number of alternatives in selecting ACK/NACK without increasing the number of states of the ACK/NACK index.

In the base station apparatus according to the above-described embodiment, the configurations are each a transmission mode used for transmission of an E-PDCCH and the transmission mode is a distributed mode in which the E-PDCCH is transmitted using two or more PRBs or a localized mode in which the E-PDCCH is transmitted using only one PRB.

Thus, specified resources of an E-PDCCH terminal specifiable by the ACK/NACK index can be switched according to a transmission mode of the E-PDCCH transmitted. It is thereby possible to increase the number of alternatives in selecting ACK/NACK without increasing the number of states of the ACK/NACK index.

In the base station apparatus according to the above-described embodiment, the configurations are each a component carrier (CC).

It is thereby possible to switch between specified resources of an E-PDCCH terminal specifiable by the ACK/NACK index in accordance with the CC by which the E-PDCCH is transmitted. It is thereby possible to increase the number of alternatives in selecting ACK/NACK without increasing the number of states of the ACK/NACK index.

In the base station apparatus according to the above-described embodiment, the control section determines a resource for transmitting an ACK/NACK signal in response to downlink data from a radio communication terminal and a virtual cell ID for generating a PUCCH from among the specified resources specified and specified virtual cell IDs beforehand, based on the configuration used for transmission of the E-PDCCH out of one or a plurality of E-PDCCH configurations indicated beforehand to the radio communication terminal and the ACK/NACK index included in the control signal, and the transmitting section transmits the control signal including the ACK/NACK index indicating the determination result of the control section via the E-PDCCH using the configuration corresponding to the determined specified resource and specified virtual cell ID.

This makes it possible to switch between specified resources of an E-PDCCH terminal specifiable by the ACK/NACK index according to the configuration in which the E-PDCCH is transmitted. It is thereby possible to increase the number of alternatives in selecting ACK/NACK without increasing the number of states of the ACK/NACK index. Moreover, by switching a virtual cell ID for generating a PUCCH according to the configuration in which the E-PDCCH is transmitted, it is possible to switch between terminal groups in which ACK/NACK signals transmitted by the PUCCH can be multiplexed.

A resource allocation method according to the above-described embodiment includes receiving a control signal including an ACK/NACK index via an enhanced physical downlink control channel (E-PDCCH) and selecting one of resource candidates specified beforehand from among a plurality of ACK/NACK resources separated from each other in frequency and code regions based on the ACK/NACK index and a configuration of the E-PDCCH.

This makes it possible to switch between specified resources of an E-PDCCH terminal specifiable by the ACK/NACK index according to the configuration of the E-PDCCH transmitted. It is thereby possible to increase the number of alternatives in selecting ACK/NACK without increasing the number of states of the ACK/NACK index.

In the resource allocation method according to the above-described embodiment, the configurations are each a frequency resource block (PRB) set.

Thus, the specified resources of the E-PDCCH terminal specifiable by the ACK/NACK index can be switched by a PRB set whereby the E-PDCCH is transmitted or received. It is thereby possible to increase the number of alternatives in selecting ACK/NACK without increasing the number of states of the ACK/NACK index.

In the resource allocation method according to the above-described embodiment, the configurations are each a search space.

Thus, the specified resources of the E-PDCCH terminal specifiable by the ACK/NACK index can be switched by a search space whereby the E-PDCCH is transmitted. It is thereby possible to increase the number of alternatives in selecting ACK/NACK without increasing the number of states of the ACK/NACK index.

In the resource allocation method according to the above-described embodiment, the configurations are each a transmission mode used for transmission or reception of an E-PDCCH and the transmission mode is a distributed mode in which the E-PDCCH is transmitted using two or more PRBs or a localized mode in which the E-PDCCH is transmitted using only one PRB.

Thus, the specified resources of the E-PDCCH terminal specifiable by the ACK/NACK index can be switched according to a transmission mode in which the E-PDCCH is transmitted. It is thereby possible to increase the number of alternatives in selecting ACK/NACK without increasing the number of states of the ACK/NACK index.

In the resource allocation method according to the above-described embodiment, the configurations are each a component carrier (CC).

It is thereby possible to switch between the specified resources of the E-PDCCH terminal specifiable by the ACK/NACK index in accordance with the CC by which the E-PDCCH is transmitted. It is thereby possible to increase the number of alternatives in selecting ACK/NACK without increasing the number of states of the ACK/NACK index.

In the resource allocation method according to the above-described embodiment, a virtual cell ID is further selected which is necessary to generate a base sequence, hopping pattern or cyclic shift hopping pattern of a PUCCH for transmitting an ACK/NACK signal based on the ACK/NACK index and the configuration used for transmission or reception of the E-PDCCH.

This makes it possible to switch between the specified resources of the E-PDCCH terminal specifiable by the ACK/NACK index according to the configuration in which the E-PDCCH is transmitted. It is thereby possible to increase the number of alternatives in selecting ACK/NACK without increasing the number of states of the ACK/NACK index. By switching the virtual cell ID for generating the PUCCH in accordance with the configuration in which the E-PDCCH is transmitted, it is possible to switch between terminal groups in which ACK/NACK signals transmitted by the PUCCH can be multiplexed.

The disclosure of Japanese Patent Application No. 2012-172224, filed on Aug. 2, 2012, including the specification, drawings and abstract is incorporated herein by reference in its entirety.

INDUSTRIAL APPLICABILITY

The present invention can be applied to a radio communication terminal, a base station apparatus, a resource allocation method and the like of a mobile communication system.

REFERENCE SIGNS LIST

11 Antenna
12 Control information generation section
13 Control information coding section
14, 17 Modulation section
15 Data coding section
16 Retransmission control section
18 Subframe configuration section
19 IFFT section
20 CP appending section
21 Radio transmitting section
22 Radio receiving section
23 CP removal section
24 Despreading section
25 Correlation processing section
26 Judgment section
41 Antenna
42 Radio receiving section
43 CP removal section
44 FFT section
45 Extraction section
46 Data demodulation section
47 Data decoding section
48 Judgment section
49 Control information demodulation section
50 Control information decoding section
51 Control information judgment section
52 Control processing section
53 A/N signal modulation section
54 Primary spreading section
55, 60 IFFT section
56 CP appending section
57 Secondary spreading section
58 Multiplexing section
59 Radio transmitting section
61 CP appending section
62 Spreading section
100 Base station
110 Control section
120 Transmitting section
200 Terminal
210 Transmitting section
220 Control section
230 Receiving section

The invention claimed is:

1. A radio communication terminal comprising:
a receiver which, in operation, receives control information using a physical resource block (PRB) set that forms an enhanced physical downlink control channel (E-PDCCH), the PRB set including one or more PRBs;
a controller which, in operation, monitors a PRB set out of a plurality of predetermined PRB sets and determines an ACK/NACK resource based on both the monitored PRB set and an ACK/NACK Resource Indicator (ARI) included in the E-PDCCH of the monitored PRB set, the ARI indicating the ACK/NACK resource corresponding to the monitored PRB set, and the ARI being independent of an enhanced control channel element (eCCE); and
a transmitter which, in operation, transmits ACK/NACK signal using the determined ACK/NACK resource.

2. The radio communication terminal according to claim 1, wherein
before the receiver receives downlink data using a physical downlink shared channel (PDSCH), the radio communication terminal is notified by radio resource control (RRC) of the plurality of predetermined PRB sets.

3. The radio communication terminal according to claim 1, wherein
before the receiver receives downlink data using a physical downlink shared channel (PDSCH), a relation between the ARI and the plurality of ACK/NACK resource candidates sets is notified, wherein the plurality of ACK/NACK resource candidates sets are respectively configured for the plurality of predetermined PRB sets.

4. The radio communication terminal according to claim 1, wherein
the plurality of predetermined PRB sets are configured in accordance with a communication environment of the radio communication terminal.

5. The radio communication terminal according to claim 1, wherein
the plurality of predetermined PRB sets are configured for the radio communication terminal.

6. The radio communication terminal according to claim 1, wherein
the plurality of predetermined PRB sets all have the same PRB frequency interval.

7. The radio communication terminal according to claim 1, wherein
the plurality of predetermined PRB sets respectively have different PRB frequency intervals.

8. The radio communication terminal according to claim 1, wherein
the controller determines the ACK/NACK resource based on a transmission mode used for transmission of the E-PDCCH, and the transmission mode is either a distributed mode where the E-PDCCH is transmitted using two or more PRBs or a localized mode where the E-PDCCH is transmitted using only one PRB.

9. The radio communication terminal according to claim 1, wherein the ARI is independent of a type of E-PDCCH.

10. A radio communication terminal comprising:
a receiver which, in operation, receives control information using a physical resource block (PRB) set that forms an enhanced physical downlink control channel (E-PDCCH), the PRB set including one or more PRBs;
a controller which, in operation, monitors one of first and second PRB sets, wherein
when the controller monitors the first PRB set, the controller determines an ACK/NACK resource based on a first ACK/NACK resource candidates set configured for the first PRB set and on an ACK/NACK Resource Indicator (ARI) included in the E-PDCCH of the first PRB set, and
when the controller monitors the second PRB set, the controller determines an ACK/NACK resource based on a second ACK/NACK resource candidates set configured for the second PRB and on an ARI included in the E-PDCCH of the second PRB set,
wherein the ARI is independent of an enhanced control channel element (eCCE); and
a transmitter which, in operation, transmits ACK/NACK signal using the determined ACK/NACK resource.

11. The radio communication terminal according to claim 10, wherein
before the receiver receives downlink data using a physical downlink shared channel (PDSCH), the radio communication terminal is notified by radio resource control (RRC) of the first and second PRB sets.

12. A radio communication method comprising:
receiving control information using a physical resource block (PRB) set that forms an enhanced physical downlink control channel (E-PDCCH), the PRB set including one or more PRBs;
monitoring a PRB set out of a plurality of predetermined PRB sets;
determining an ACK/NACK resource based on both the monitored PRB set and an ACK/NACK Resource Indicator (ARI) included in the E-PDCCH of the monitored PRB set, the ARI indicating the ACK/NACK resource corresponding to the monitored PRB set, and the ARI being independent of an enhanced control channel element (eCCE); and
transmitting ACK/NACK signal using the determined ACK/NACK resource.

13. The radio communication method according to claim 12, further comprising:
before receiving downlink data using a physical downlink shared channel (PDSCH), being notified by radio resource control (RRC) of the plurality of predetermined PRB sets.

14. The radio communication method according to claim 12, further comprising:
before receiving downlink data using a physical downlink shared channel (PDSCH), being notified of a relation between the ARI and a plurality of ACK/NACK resource candidates sets that are respectively configured for the plurality of predetermined PRB sets.

15. The radio communication method according to claim 12, wherein
the plurality of predetermined PRB sets are configured in accordance with a communication environment of the radio communication method.

16. The radio communication method according to claim 12, wherein
the plurality of predetermined PRB sets are configured for a radio communication terminal.

17. The radio communication method according to claim 12, wherein
the plurality of predetermined PRB sets all have the same PRB frequency interval.

18. The radio communication method according to claim 12, wherein
the plurality of predetermined PRB sets respectively have different PRB frequency intervals.

19. The radio communication method according to claim 12, comprising:
determining the ACK/NACK resource based on a transmission mode used for transmission of the E-PDCCH, wherein the transmission mode is either a distributed mode where the E-PDCCH is transmitted using two or more PRBs or a localized mode where the E-PDCCH is transmitted using only one PRB.

20. The radio communication method according to claim 12, wherein the ARI is independent of a type of E-PDCCH.

21. A radio communication method comprising:
receiving control information using a physical resource block (PRB) set that forms an enhanced physical downlink control channel (E-PDCCH), the PRB set including one or more PRBs;
monitoring one of first and second PRB sets;
when monitoring the first PRB set, determining an ACK/NACK resource based on a first ACK/NACK resource candidates set configured for the first PRB set and on an ACK/NACK Resource Indicator (ARI) included in the E-PDCCH of the first PRB set;
when monitoring the second PRB set, determining an ACK/NACK resource based on a second ACK/ACK resource candidates set configured for the second PRB set and on an ARI included in the E-PDCCH of the second PRB set,
wherein the ARI is independent of an enhanced control channel element (eCCE); and
transmitting ACK/NACK signal using the determined ACK/NACK resource.

22. The radio communication method according to claim 21, further comprising:
before receiving downlink data using a physical downlink shared channel (PDSCH), being notified by radio resource control (RRC) of the first and second PRB sets.

* * * * *